United States Patent
Gunnarsson et al.

(10) Patent No.: US 12,495,273 B2
(45) Date of Patent: Dec. 9, 2025

(54) RETRIEVAL OF POSITIONING ASSISTANCE DATA BASED ON PERSISTENCE INFORMATION

(71) Applicant: Telefonaktiebolaget LM Ericsson (publ), Stockholm (SE)

(72) Inventors: Fredrik Gunnarsson, Linköping (SE); Ritesh Shreevastav, Upplands Väsby (SE); Åke Busin, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 469 days.

(21) Appl. No.: 17/920,090

(22) PCT Filed: May 17, 2021

(86) PCT No.: PCT/SE2021/050466
§ 371 (c)(1),
(2) Date: Oct. 20, 2022

(87) PCT Pub. No.: WO2021/235995
PCT Pub. Date: Nov. 25, 2021

(65) Prior Publication Data
US 2023/0164512 A1    May 25, 2023

Related U.S. Application Data

(60) Provisional application No. 63/026,346, filed on May 18, 2020.

(51) Int. Cl.
*H04W 4/021* (2018.01)
(52) U.S. Cl.
CPC .................. *H04W 4/021* (2013.01)
(58) Field of Classification Search
CPC .......... H04W 4/021; H04W 4/06; H04W 4/50
See application file for complete search history.

(56) References Cited

U.S. PATENT DOCUMENTS 8,730,932 B2 * 5/2014 Islam .................... G01S 13/767
370/441
10,461,847 B2 * 10/2019 Radulescu .......... H04W 64/003
(Continued)

FOREIGN PATENT DOCUMENTS

EP       3481110 A1    5/2019

OTHER PUBLICATIONS

"3GPP TS 24.301 V16.4.0", 3rd Generation Partnership Project; Technical Specification Group Core Network and Terminals; Non-Access-Stratum (NAS) protocol for Evolved Packet System (EPS); Stage 3 (Release 16), Mar. 2020, pp. 1-573.
(Continued)

*Primary Examiner* — Santiago Garcia
(74) *Attorney, Agent, or Firm* — Murphy, Bilak & Homiller, PLLC

(57) ABSTRACT

Embodiments include methods for a user equipment (UE) to obtain positioning assistance data associated with a cell of a wireless network. Such methods include receiving a first part of the positioning assistance data associated with the cell from a positioning node via unicast in the cell, and receiving a second part of the positioning assistance data associated with the cell via system information (SI) broadcast in the cell. Such methods also include, based on the second part, determining a persistence indicator associated with the first part, and based on the persistence indicator, selectively requesting an updated first part associated with the cell from a network node of the wireless network. Other embodiments include complementary methods for a positioning node as well as UEs and positioning nodes configured to perform such methods.

20 Claims, 12 Drawing Sheets

(56) References Cited

U.S. PATENT DOCUMENTS

| | | | |
|---|---|---|---|
| 11,012,966 B2* | 5/2021 | Cui | H04W 64/00 |
| 2016/0094657 A1* | 3/2016 | Vieira | H04L 67/1097 |
| | | | 709/217 |
| 2018/0284149 A1* | 10/2018 | Kommi | G01S 5/0264 |
| 2019/0037338 A1* | 1/2019 | Edge | H04W 4/02 |
| 2019/0268830 A1* | 8/2019 | Kim | H04W 68/00 |
| 2019/0281587 A1* | 9/2019 | Zhang | H04W 72/23 |
| 2020/0037145 A1 | 1/2020 | Gunnarsson et al. | |
| 2020/0120578 A1 | 4/2020 | Shreevastav et al. | |
| 2020/0132829 A1* | 4/2020 | Jiang | H04W 4/40 |
| 2020/0169831 A1* | 5/2020 | Li | G01S 19/43 |
| 2020/0228255 A1* | 7/2020 | Jiang | H04L 1/1819 |
| 2020/0229255 A1* | 7/2020 | Kang | H04W 36/0066 |
| 2020/0267683 A1* | 8/2020 | Edge | G01S 13/767 |
| 2022/0086741 A1* | 3/2022 | Liao | G08G 5/26 |
| 2022/0124469 A1* | 4/2022 | Liao | H04W 4/50 |

OTHER PUBLICATIONS

"3GPP TS 36.305 V16.0.0", 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 16), Mar. 2020, pp. 1-91.

"3GPP TS 36.331 V16.0.0", 3rd Generation Partnership Project; Technical Specification Group Radio Access Network; Evolved Universal Terrestrial Radio Access (E-UTRA); Radio Resource Control (RRC); Protocol specification (Release 16), Mar. 2020, pp. 1-1048.

"3GPP TS 38.305 V16.0.0", 3rd Generation Partnership Project; Technical Specification Group Radio Access Network; NG Radio Access Network (NG-RAN); Stage 2 functional specification of User Equipment (UE) positioning in NG-RAN (Release 16), Mar. 2020, pp. 1-107.

"3GPP TS 37.355 V16.0.0", 3rd Generation Partnership Project; Technical Specification Group Radio Access Network; LTE Positioning Protocol (LPP) (Release 16), Mar. 2020, pp. 1-281.

"On Demand Delivery of Positioning Assistance Data", 3GPP TSG-RAN WG2 #108 R2-1915656, Reno, USA, Nov. 18-22, 2019, pp. 1-7.

"Remaining issues regarding on-demand SI for Positioning", 3GPP TSG-RAN WG2 #107bis, R2-1913318, Chongqing, China, Oct. 14-18, 2019, pp. 1-4.

"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.

\* cited by examiner

```
-- ASN1START
RequestAssistanceData ::= SEQUENCE {
    criticalExtensions    CHOICE {
        c1                CHOICE {
            requestAssistanceData-r9    RequestAssistanceData-r9-IEs,
            spare3 NULL, spare2 NULL, spare1 NULL
        },
        criticalExtensionsFuture SEQUENCE {}
    }
}

RequestAssistanceData-r9-IEs ::= SEQUENCE {
    commonIEsRequestAssistanceData      CommonIEsRequestAssistanceData      OPTIONAL,
    a-gnss-RequestAssistanceData        A-GNSS-RequestAssistanceData        OPTIONAL,
    otdoa-RequestAssistanceData         OTDOA-RequestAssistanceData         OPTIONAL,
    epdu-RequestAssistanceData          EPDU-Sequence                       OPTIONAL,
    ...,
    [[
    sensor-RequestAssistanceData-r14    Sensor-RequestAssistanceData-r14    OPTIONAL,
    tbs-RequestAssistanceData-r14       TBS-RequestAssistanceData-r14       OPTIONAL,
    wlan-RequestAssistanceData-r14      WLAN-RequestAssistanceData-r14      OPTIONAL
    ]],
    [[
    nr-Multi-RTT-RequestAssistanceData-r16 NR-Multi-RTT-RequestAssistanceData-r16 OPTIONAL,
    nr-DL-AoD-RequestAssistanceData-r16    NR-DL-AoD-RequestAssistanceData-r16    OPTIONAL,
    nr-DL-TDOA-RequestAssistanceData-r16   NR-DL-TDOA-RequestAssistanceData-r16   OPTIONAL
    ]]
}
-- ASN1STOP
```

FIG. 8B

```
-- ASN1START
CommonIEsRequestAssistanceData ::= SEQUENCE {
    primaryCellID        ECGI                                    OPTIONAL,    -- Cond EUTRA
    ...,
    [[
    segmentationInfo-r14    SegmentationInfo-r14                 OPTIONAL    -- Cond Segmentation
    ]],
    [[
    periodicAssistanceDataReq-r15    PeriodicAssistanceDataControlParameters-r15 OPTIONAL,    -- Cond PerADreq
    primaryCellID-r15                NCGI-r15                                    OPTIONAL    -- Cond NR
    ]]
}
-- ASN1STOP
```

```
-- ASN1START
ProvideAssistanceData ::= SEQUENCE {
    criticalExtensions         CHOICE {
        c1                     CHOICE {
            provideAssistanceData-r9    ProvideAssistanceData-r9-IEs,
            spare3 NULL, spare2 NULL, spare1 NULL
        },
        criticalExtensionsFuture SEQUENCE {}
    }
}

ProvideAssistanceData-r9-IEs ::= SEQUENCE {
    commonIEsProvideAssistanceData      CommonIEsProvideAssistanceData      OPTIONAL,   -- Need ON
    a-gnss-ProvideAssistanceData        A-GNSS-ProvideAssistanceData        OPTIONAL,   -- Need ON
    otdoa-ProvideAssistanceData         OTDOA-ProvideAssistanceData         OPTIONAL,   -- Need ON
    epdu-Provide-Assistance-Data        EPDU-Sequence                       OPTIONAL,   -- Need ON
    ...,
    [[
    sensor-ProvideAssistanceData-r14    Sensor-ProvideAssistanceData-r14    OPTIONAL,   -- Need ON
    tbs-ProvideAssistanceData-r14       TBS-ProvideAssistanceData-r14       OPTIONAL,   -- Need ON
    wlan-ProvideAssistanceData-r14      WLAN-ProvideAssistanceData-r14      OPTIONAL    -- Need ON
    ]],
    [[
    nr-DL-PRS-ProvideAssistanceData-r16      NR-DL-PRS-ProvideAssistanceData-r16 OPTIONAL,      -- Need ON
    nr-Multi-RTT-ProvideAssistanceData-r16   NR-Multi-RTT-ProvideAssistanceData-r16 OPTIONAL,   -- Need ON
    nr-DL-AoD-ProvideAssistanceData-r16      NR-DL-AoD-ProvideAssistanceData-r16 OPTIONAL,      -- Need ON
    nr-DL-TDOA-ProvideAssistanceData-r16     NR-DL-TDOA-ProvideAssistanceData-r16 OPTIONAL      -- Need ON
    ]]
}
-- ASN1STOP
```

FIG. 8E

```
-- ASN1START
NR-DL-PRS-ProvideAssistanceData-r16 ::= SEQUENCE {
    nr-DL-PRS-AssistanceData-r16        NR-DL-PRS-AssistanceData-r16        OPTIONAL,   -- Need ON
    nr-UEB-TRP-LocationData-r16         NR-UEB-TRP-LocationData-r16         OPTIONAL,   -- Cond UEB
    nr-UEB-TRP-RTD-Info-r16             NR-UEB-TRP-RTD-Info-r16             OPTIONAL,   -- Cond UEB
    nr-Pos-Error-r16                    NR-Pos-Error-r16                    OPTIONAL,   -- Need ON
    ...
}
-- ASN1STOP
```

```
-- ASN1START
SystemInformationBlockPos-r15 ::= SEQUENCE {
    assistanceDataSIB-Element-r15      OCTET STRING,
    lateNonCriticalExtension           OCTET STRING    OPTIONAL,
    ...
}
-- ASN1STOP
```

FIG. 9A

```
-- ASN1START
AssistanceDataSIBelement-r15 ::= SEQUENCE {
    valueTag-r15                   INTEGER (0..63)                        OPTIONAL,
    expirationTime-r15             UTCTime                                OPTIONAL,
    cipheringKeyData-r15           CipheringKeyData-r15                   OPTIONAL,
    segmentationInfo-r15           SegmentationInfo-r15                   OPTIONAL,
    assistanceDataElement-r15      OCTET STRING,
    ...
}
CipheringKeyData-r15 ::= SEQUENCE {
    cipherSetID-r15                INTEGER (0..65535),
    d0-r15                         BIT STRING (SIZE (1..128)),
    ...
}
SegmentationInfo-r15 ::= SEQUENCE {
    segmentationOption-r15           ENUMERATED {pseudo-seg, octet-string-seg},
    assistanceDataSegmentType-r15    ENUMERATED {notLastSegment, lastSegment},
    assistanceDataSegmentNumber-r15  INTEGER (0..63),
    ...
}
-- ASN1STOP
```

FIG. 9B

| | posSibType [12] | assistanceDataElement |
|---|---|---|
| GNSS Common Assistance Data (clause 6.5.2.2) | posSibType1-1 | GNSS-ReferenceTime |
| | posSibType1-2 | GNSS-ReferenceLocation |
| | posSibType1-3 | GNSS-IonosphericModel |
| | posSibType1-4 | GNSS-EarthOrientationParameters |
| | posSibType1-5 | GNSS-RTK-ReferenceStationInfo |
| | posSibType1-6 | GNSS-RTK-CommonObservationInfo |
| | posSibType1-7 | GNSS-RTK-AuxiliaryStationData |
| | posSibType1-8 | GNSS-SSR-CorrectionPoints |
| GNSS Generic Assistance Data (clause 6.5.2.2) | posSibType2-1 | GNSS-TimeModelList |
| | posSibType2-2 | GNSS-DifferentialCorrections |
| | posSibType2-3 | GNSS-NavigationModel |
| | posSibType2-4 | GNSS-RealTimeIntegrity |
| | posSibType2-5 | GNSS-DataBitAssistance |
| | posSibType2-6 | GNSS-AcquisitionAssistance |
| | posSibType2-7 | GNSS-Almanac |
| | posSibType2-8 | GNSS-UTC-Model |
| | posSibType2-9 | GNSS-AuxiliaryInformation |
| | posSibType2-10 | BDS-DifferentialCorrections |
| | posSibType2-11 | BDS-GridModelParameter |
| | posSibType2-12 | GNSS-RTK-Observations |
| | posSibType2-13 | GLO-RTK-BiasInformation |
| | posSibType2-14 | GNSS-RTK-MAC-CorrectionDifferences |
| | posSibType2-15 | GNSS-RTK-Residuals |
| | posSibType2-16 | GNSS-RTK-FKP-Gradients |
| | posSibType2-17 | GNSS-SSR-OrbitCorrections |
| | posSibType2-18 | GNSS-SSR-ClockCorrections |
| | posSibType2-19 | GNSS-SSR-CodeBias |
| | posSibType2-20 | GNSS-SSR-URA |
| | posSibType2-21 | GNSS-SSR-PhaseBias |
| | posSibType2-22 | GNSS-SSR-STEC-Correction |
| | posSibType2-23 | GNSS-SSR-GriddedCorrection |
| | posSibType2-24 | NavIC-DifferentialCorrections |
| | posSibType2-25 | NavIC-GridModelParameter |
| OTDOA Assistance Data (clause 7.4.2) | posSibType3-1 | OTDOA-UE-Assisted |
| Barometric Assistance Data (clause 6.5.5.8) | posSibType4-1 | Sensor-AssistanceDataList |
| TBS Assistance Data (clause 6.5.4.8) | posSibType5-1 | TBS-AssistanceDataList |
| NR DL-TDOA/DL-AoD Assistance Data (clause 7.4.2) | posSibType6-1 | NR-DL-Measurement-AD |
| | posSibType6-2 | NR-UEB-TRP-LocationData |
| | posSibType6-3 | NR-UEB-TRP-RTD-Info |

FIG. 9C

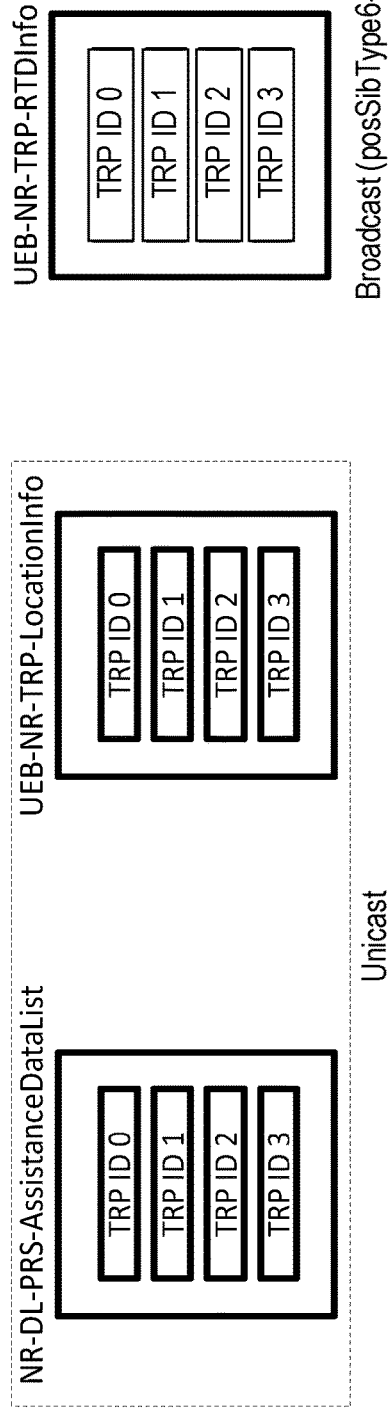
FIG. 13A
```
-- ASN1START
NR-DL-PRS-ProvideAssistanceData-r16 ::= SEQUENCE {
    nr-DL-PRS-AssistanceData-r16        NR-DL-PRS-AssistanceData-r16    OPTIONAL,    -- Need ON
    nr-UEB-TRP-LocationData-r16         NR-UEB-TRP-LocationData-r16     OPTIONAL,    -- Cond UEB
    nr-Pos-Error-r16                    NR-Pos-Error-r16                OPTIONAL,    -- Need ON
    ...
}
-- ASN1STOP
```
FIG. 13B
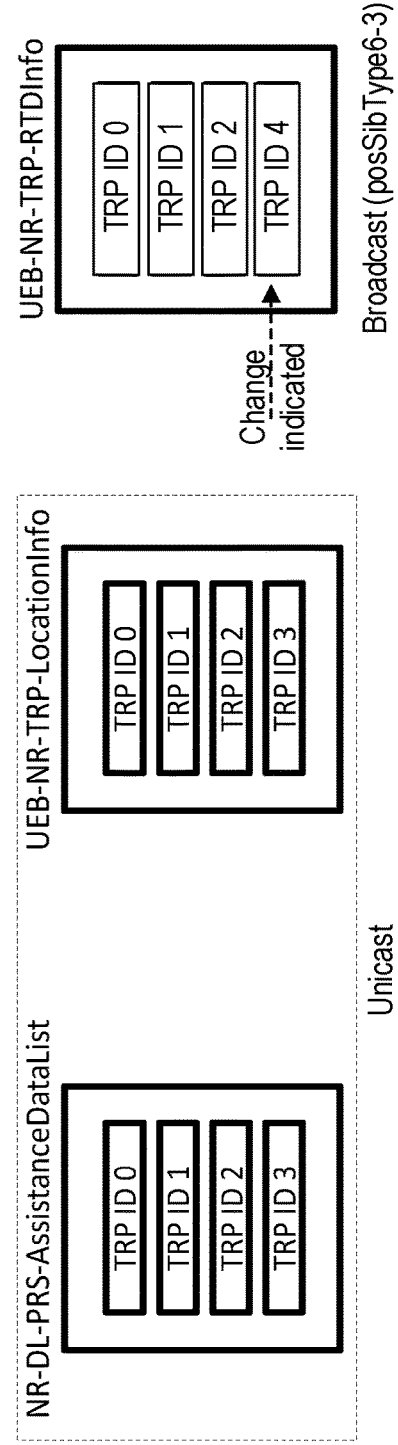
FIG. 13C

RETRIEVAL OF POSITIONING ASSISTANCE DATA BASED ON PERSISTENCE INFORMATION

TECHNICAL FIELD

The present invention generally relates to wireless communication networks, and particularly relates to improvements to positioning of user equipment (UE) in wireless networks based on assistance data from the wireless network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of Long Term Evolution (LTE) technology is provided for context since it shares many features with NR.

LTE is an umbrella term for fourth generation (4G) radio access technologies (RATs) developed within 3GPP and initially standardized in Releases 8 and 9, also known as Evolved UTRAN (E-UTRAN). LTE is available in various frequency bands and is accompanied by improvements to non-radio aspects referred to as System Architecture Evolution (SAE), including the Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMES 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MIME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at hic time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)— a UE identity used for signaling between UE and network—is configured for a UE in RRC_CONNECTED state.

The multiple access scheme for the LTE PHY is based on Orthogonal Frequency Division Multiplexing (OFDM) with a cyclic prefix (CP) in the downlink (DL), and on Single-Carrier Frequency Division Multiple Access (SC-FDMA) with a cyclic prefix in the uplink (UL). To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 0.5-ms slots. A 1-ms subframe includes two consecutive slots, each of which includes $N^{DL}_{symb}$ OFDM symbols comprised of $N_{sc}$ OFDM subcarriers. Similarly, each UL slot consists of $N^{UL}_{symb}$ OFDM symbols, each of which includes $N_{sc}$ OFDM subcarriers. A combination of a particular subcarrier in a particular symbol is known as a resource element (RE).

The LTE PHY maps various DL and UL physical channels to the resources described above. In general, a physical channel corresponds to a set of REs carrying information that originates from higher layers. Within the LTE DL and UL, certain REs within each LTE subframe are reserved for the transmission of reference signals. DL demodulation reference signals (DM-RS) are transmitted to aid the UE in the reception of an associated physical channel (e.g., PDCCH or PDSCH). Other DL reference signals include cell-specific reference signals (CRS), positioning reference signals (PRS), and CSI reference signals (CSI-RS). Other RS-like DL signals include Primary Synchronization Sequence (PSS) and Secondary Synchronization Sequence (SSS), which facilitate the UEs time and frequency synchronization and acquisition of system parameters (e.g., via PBCH). UL reference signals include DM-RS that are transmitted to aid the eNB in the reception of an associated physical channel (e.g., PUCCH or PUSCH); and sounding reference signals (SRS), which are not associated with any uplink channel.

3GPP standards provide various ways for positioning (e.g., determining the position of, locating, and/or determining the location of) UEs operating in LTE networks. In general, an LTE positioning node (referred to as "E-SMLC" or "location server") configures the target device (e.g., UE), an eNB, or a radio network node dedicated for positioning measurements (e.g., a "location measurement unit" or "LMU") to perform one or more positioning measurements according to one or more positioning methods. For example, the positioning measurements can include timing (and/or timing difference) measurements on UE, network, and/or satellite transmissions. The positioning measurements are used by the target device, the measuring node, and/or the positioning node to determine the location of the target device.

5G/NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, NR DL and UL time-domain physical resources are organized into sub-frames, slots, and OFDM-based symbols. NR also uses many of the same physical channels as LTE. Additionally, the NR RRC layer includes RRC_IDLE and RRC_CONNECTED states, but adds an additional state known as RRC_INACTIVE, which has some properties similar to a "suspended" condition used in LTE. In addition to providing coverage via cells, as in LTE, NR networks also provide coverage via "beams." In general, a DL "beam" is a coverage area of a network-transmitted RS that may be measured or monitored by a UE.

UE positioning is also expected to be an important feature for NR networks, and may include additional positioning techniques, use cases, scenarios, and/or applications beyond those prevalent in LTE. One common feature of both LTE and NR positioning is provisioning of assistance data to UEs by the network. Such assistance data can facilitate and/or improve measurements needed for various positioning techniques and, in some cases, enable a UE to determine its own position.

Even so, the amount of assistance data needed to support various positioning techniques can be relatively large, such that delivering it in a timely manner via available network resources can be very costly and/or difficult. Moreover, network provisioning often does not consider whether (and to what extent) a UE already has the necessary assistance data, which can result in limited network resources being consumed by redundant assistance data. However, there are currently no mechanisms to avoid such redundancy while at the same time ensuring timely delivery of updated and/or new assistance data to UEs.

SUMMARY

Embodiments of the present disclosure provide specific improvements to positioning of user equipment (UE) operating in a wireless network, such as by facilitating solutions to overcome the exemplary problems summarized above and described in more detail below.

Some embodiments of the present disclosure include methods (e.g., procedures) to obtain positioning assistance data associated with a cell of a wireless network. These exemplary methods can be implemented by a UE (e.g., wireless device, IoT device, etc. or component thereof).

These exemplary methods can include receiving a first part of the positioning assistance data associated with the cell from a positioning node via unicast in the cell. These exemplary methods can also include receiving a second part of the positioning assistance data associated with the cell via system information (SI) broadcast in the cell. These exemplary methods can also include, based on the second part, determining a persistence indicator associated with the first part. These exemplary methods can also include, based on the persistence indicator, selectively requesting an updated first part associated with the cell from a network node of the wireless network.

In some embodiments, selectively requesting can include requesting an updated first part from the network node when the persistence indicator indicates that the first part is not persistent and refraining from requesting an updated first part from the network node when the persistence indicator indicates that the first part is persistent.

In some embodiments, the second part can include an explicit persistence indicator for the first part. In such case, the UE can determine persistence directly from this indicator. In other embodiments, these exemplary methods can also include receiving a further second part via SI broadcast in the cell. The further second part can be received before the second part.

In some of these embodiments, the second part includes an associated version number and the further second part includes an associated further version number. In such embodiments, determining the persistence indicator can include determining that the first part is persistent when the version number is equal to the further version number and determining that the first part is not persistent when the version number is not equal to the further version number.

In other of these embodiments, the second part includes a first number of identifiers of transmission sources of positioning signals and the further second part includes a second number of further identifiers of transmission sources of positioning signals. In such embodiments, determining the persistence indicator can include determining that the first part is persistent when the first number is equal to the second number and the further identifiers are the same as the identifiers, and otherwise determining that the first part is not persistent.

In some embodiments, the second part includes an associated expiration time. In such embodiments, the second part is received before the first part and determining the persistence indicator can include determining that the first part is persistent when the current time is before the expiration time associated with the second part and determining that the first part is not persistent when the current time is after the expiration time associated with the second part.

In some embodiments, the second part includes a timestamp indicating when the second part was received, from the network node, by a radio network node (RNN) that broadcasts the SI in the cell. In such embodiments, the first part is received before the second part and determining the persistence indicator can include determining that the first part is persistent when the first part was received before the timestamp and determining that the first part is not persistent when the first part was received after the timestamp.

In some embodiments, the first part can include an associated area of validity. In such embodiments, determining the persistence indicator can include can be further based on whether the cell (e.g., from which the UE receives the second part by SI) is within the area of validity. In some embodiments, the first part and the second part are assistance data for a single positioning method, e.g., UE-based observed time difference of arrival (OTDOA). According to that example, the second part can include relative time difference (RTD) between transmission times of downlink positioning reference signals (DL PRS) from a plurality of sources (e.g., TRPs) in the wireless network. Likewise, the first part can include locations of the plurality of sources, which can change less frequently than the RTDs.

Other embodiments of the present disclosure include methods (e.g., procedures) for providing positioning assistance data to UEs operating in a cell of the wireless network. These exemplary methods can be implemented by a positioning node (e.g., E-SMLC, SLP, LMF, etc. or a component thereof).

These exemplary methods can include sending, to one or more UEs via unicast in the cell, a first part of positioning assistance data associated with the cell. These exemplary methods can include providing a second part of the positioning assistance data associated with the cell to be broadcast in the cell as system information (SI). For example, the positioning node can send the second part to a radio network node (RNN) serving the cell. The second part can include information that facilitates UE determination of a persistence indicator associated with the first part, such as described above.

In some embodiments, the second part can include an explicit persistence indicator for the first part. In such case, UEs can determine persistence directly from this indicator.

In other embodiments these exemplary methods can also include, before providing the second part, providing a further second part of the assistance data associated with the cell to be broadcast in the cell via SI.

In some of these embodiments, the second part includes an associated version number and the further second part includes an associated further version number. UEs can determine the persistence indicator from these version numbers, as described above.

In other of these embodiments, the second part includes a first number of identifiers of transmission sources of positioning signals and the further second part includes a second number of further identifiers of transmission sources of positioning signals. UEs can determine the persistence indicator based on first number, second number, the identifiers, and the further identifiers, as described above.

In some embodiments, the second part includes an expiration time for the second part and the second part is provided for broadcast before sending the first part. UEs can determine the persistence indicator based on the expiration time, as described above.

In some embodiments, the first part also includes an associated area of validity, which the UE can use to determine the persistence indicator, as described above.

In some embodiments, the first part and the second part are assistance data for a single positioning method, e.g., UE-based OTDOA. According to that example, the second part can include RTD between transmission times of DL PRS from a plurality of sources (e.g., TRPs) in the wireless network. Likewise, the first part can include locations of the plurality of sources, which can change less frequently than the RTDs.

In some embodiments, these exemplary methods can also include receiving from a UE a request for an updated first part of the positioning assistance data associated with the cell. This request can be based on the second part indicating that the first part is not persistent.

Other embodiments include UEs (e.g., wireless devices, IoT devices, etc. or component thereof) and positioning nodes (e.g., E-SMLC, SLP, LMF, etc. or a component thereof) configured to perform operations corresponding to any of the exemplary methods described herein. Other embodiments include non-transitory, computer-readable media storing program instructions that, when executed by processing circuitry, configure such UEs or positioning nodes to perform operations corresponding to any of the exemplary methods described herein.

These and other embodiments described herein facilitate a UE to obtain a persistence indicator associated with positioning assistance data. Based on the persistence indicator, a UE can determine changes in the assistance data and request updated assistance data only when a change is determined. Advantages include more efficient distribution of assistance data by the network (e.g., using fewer network resources), as well as reducing the risk that a UE performs incorrect positioning measurements and/or position estimates based on invalid assistance data.

These and other objects, features, and advantages of embodiments of the present disclosure will become apparent upon reading the following Detailed Description in view of the Drawings briefly described below.

BRIEF DESCRIPTION OF THE DRAWINGS

FIG. 8, which includes FIGS. 8A-E, illustrates an exemplary arrangement for a UE to obtain positioning assistance via unicast transmission from a positioning node.

FIG. 8, which includes FIGS. 8A-8C, shows various ASN.1 data structures for positioning assistance information.

FIG. 9, which includes FIGS. 9A-C, shows two ASN.1 data structures defining exemplary information elements (IEs) used to broadcast positioning assistance data.

FIG. 13, which includes FIGS. 13A-C, shows a network signaling diagram illustrating various messages exchanged between UE, NG-RAN, and network functions in support of UE-based OTDOA positioning, according to various exemplary embodiments of the present disclosure.

DETAILED DESCRIPTION

Figure 1:
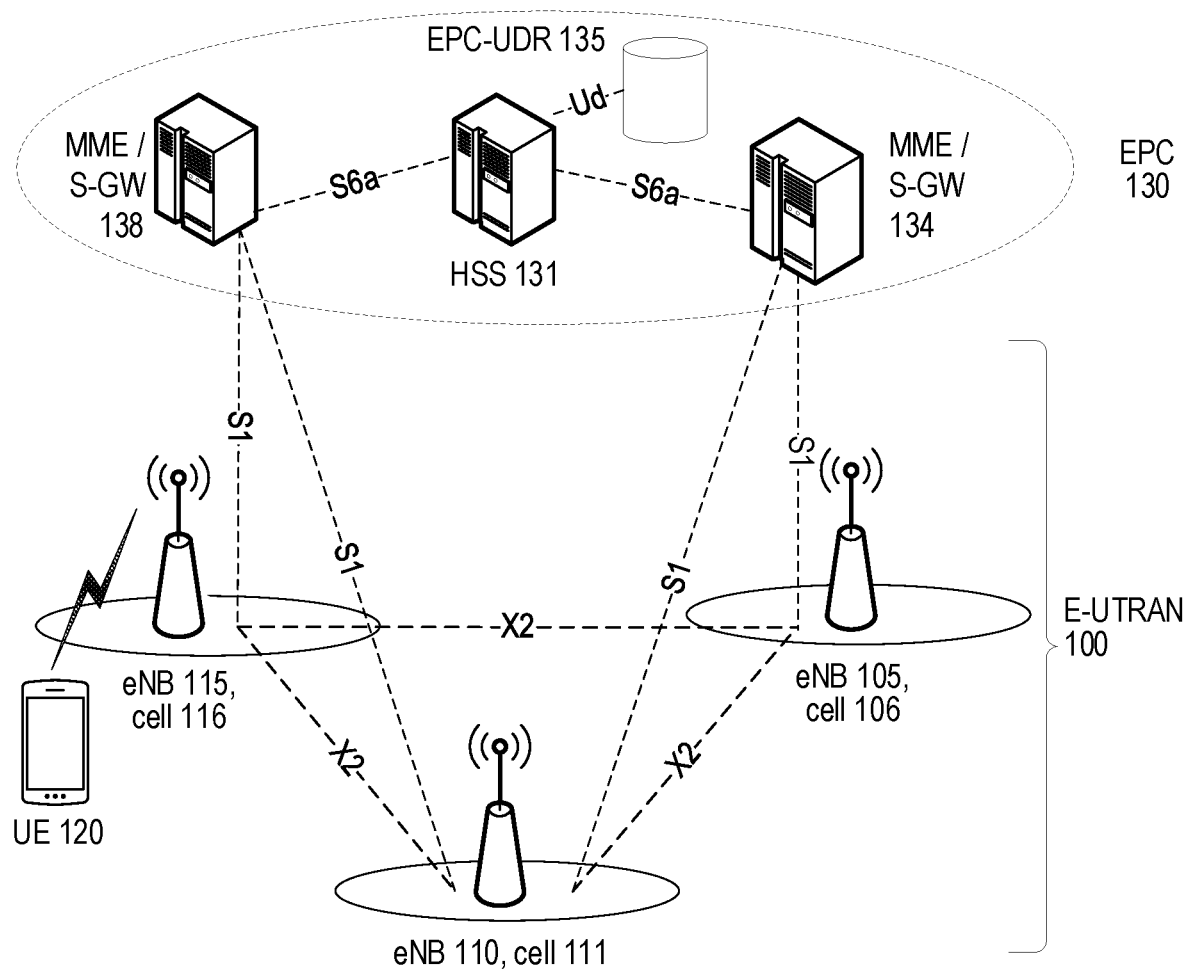
FIG. 1 is a high-level block diagram of an exemplary architecture of the Long-Term Evolution (LTE) Evolved UTRAN (E-UTRAN) and Evolved Packet Core (EPC) network.
Figure 2:
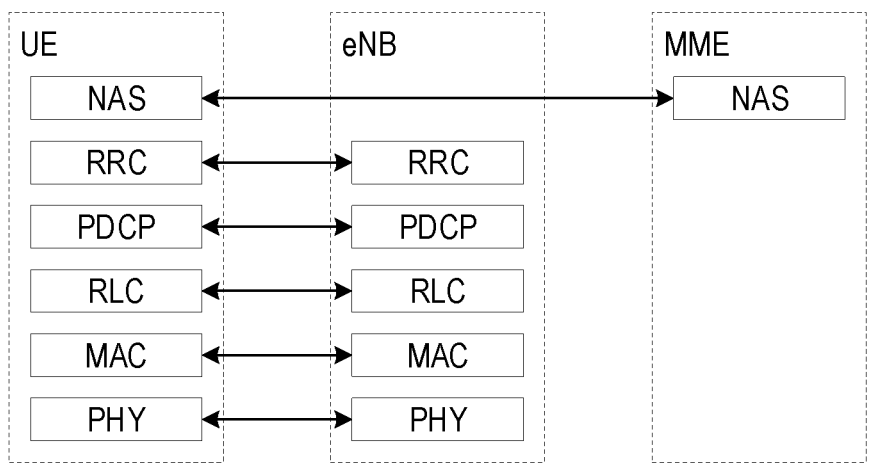
FIG. 2 shows exemplary control plane (CP) protocol layers of the radio interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point (TP), a transmission reception point (TRP), a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), a location management function (LMF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Base station: As used herein, a "base station" may comprise a physical or a logical node transmitting or controlling the transmission of radio signals, e.g., eNB, gNB, ng-eNB, en-gNB, centralized unit (CU)/distributed unit (DU), transmitting radio network node, transmission point (TP), transmission reception point (TRP), remote radio head (RRH), remote radio unit (RRU), Distributed Antenna System (DAS), relay, etc.

Location server: As used herein, "location server" (or equivalently, "positioning node") can refer to a network node with positioning functionality, e.g., providing assistance data, requesting positioning measurements, calculating location based on positioning measurements, etc. A location server may or may not be part of a base station.

Positioning signals: As used herein, "positioning signals" may include any signal or channel to be received by the UE for performing a positioning measurement such as a DL reference signal, PRS, SSB, synchronization signal, DM-RS, CSI-RS, etc.

Positioning measurements: As used herein, "positioning measurements" may include timing measurements (e.g., time difference of arrival, TDOA, RSTD, time of arrival, TOA, Rx-Tx, RTT, etc.), power-based measurements (e.g., RSRP, RSRQ, SINR, etc.), and/or identifier detection/measurement (e.g., cell ID, beam ID, etc.) that are configured for a positioning method (e.g., OTDOA, E-CID, etc.). UE positioning measurements may be reported to a network node or may be used for positioning purposes by the UE.

Positioning beam: As used herein, a "positioning beam" can include any beam carrying at least one positioning signal and/or that is used for a positioning purpose such as for measurements supporting one or more positioning methods (e.g., OTDOA, AOA, etc.). A positioning beam can have its own explicit identity or can be identified through an index associated with a specific signal that the beam carries.

The above definitions are not meant to be exclusive. In other words, various ones of the above terms may be explained and/or described elsewhere in the present disclosure using the same or similar terminology. Nevertheless, to the extent that such other explanations and/or descriptions conflict with the above definitions, the above definitions should control.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, the amount of assistance data needed to support various positioning techniques can be relatively large, such that delivering it in a timely manner via available network resources can be very costly and/or difficult. Moreover, network provisioning often does not consider whether (and to what extent) a UE already has the assistance data, which can result in limited network resources being consumed by redundant assistance data. There are currently no mechanisms to avoid such redundancy while at the same time ensuring timely delivery of updated and/or new assistance data to UEs. This is discussed in more detail after the following discussion of 5G/NR network architecture and LTE and NR positioning architectures.

Figure 3:
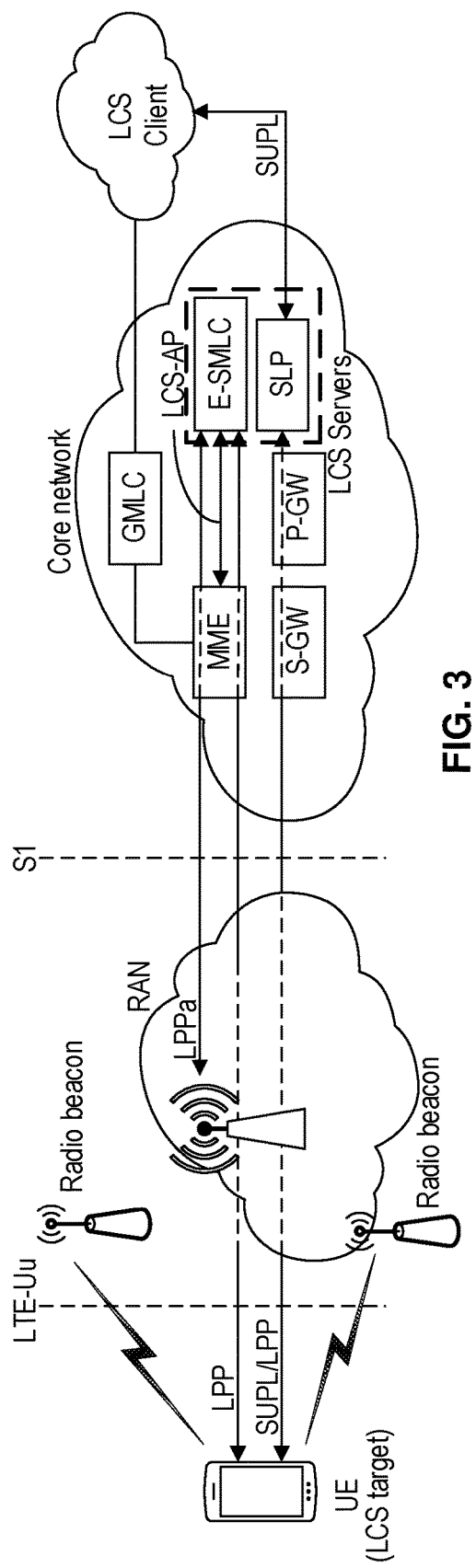
FIGS. 3-4 show two views of an exemplary positioning architecture for an LTE network.

FIG. 3 shows an exemplary positioning architecture within an LTE network. Three important functional elements of the LTE positioning architecture are LCS Client, LCS target, and LCS Server. The LCS Server is a physical or logical entity (e.g., as embodied by the E-SMLC or SLP in FIG. 3) that manages positioning for an LCS target (e.g., as embodied by the UE in FIG. 3) by collecting measurements and other location information, assisting the terminal in measurements when necessary, and estimating the LCS target location. An LCS Client is a software and/or hardware entity that interacts with an LCS Server for the purpose of obtaining location information for one or more LCS targets (i.e., the entities being positioned) such as the UE in FIG. 3. LCS Clients may also reside in the LCS targets themselves. An LCS Client sends a request to an LCS Server to obtain location information, and the LCS Server processes and serves the received requests and sends the positioning result and optionally a velocity estimate to the LCS Client. A positioning request can be originated from the terminal or a network node or external client.

In the LTE architecture shown in FIG. 3, position calculation can be conducted, for example, by the LCS Server (e.g., E-SMLC or SLP) or by the LCS target (e.g., a UE). The former approach corresponds to the UE-assisted positioning mode when it is based on UE measurements, whilst the latter corresponds to the UE-based positioning mode. The following positioning methods are supported in LTE:

Enhanced Cell ID (E-CID). Utilizes information to associate the UE with the geographical area of a serving cell, and then additional information to determine a finer granularity position. The following measurements are supported for E-CID: AoA (base station only), UE Rx-Tx time difference, timing advance (TA) types 1 and 2, reference signal received power (RSRP), and reference signal received quality (RSRQ).

Assisted GNSS. GNSS information retrieved by the UE, supported by assistance information provided to the UE from the E-SMLC.

OTDOA (Observed Time Difference of Arrival). The UE receives and measures Global Navigation Satellite System (GNSS) signals, supported by assistance information provided to the UE from E-SMLC.

UTDOA (Uplink TDOA). The UE is requested to transmit a specific waveform that is detected by multiple location measurement units (LMUs, which may be standalone, co-located or integrated into an eNB) at known positions. These measurements are forwarded to the E-SMLC for multilateration.

In addition, one or more of the following positioning modes can be utilized in each of the positioning methods listed above:

UE-Assisted: The UE performs measurements with or without assistance from the network and sends these measurements to the E-SMLC where the position calculation may take place.

UE-Based: The UE performs measurements and calculates its own position with assistance from the network.

Standalone: The UE performs measurements and calculates its own position without network assistance.

The detailed assistance data may include information about network node locations, beam directions, etc. The assistance data can be provided to the UE via unicast or via broadcast.

Figure 4:
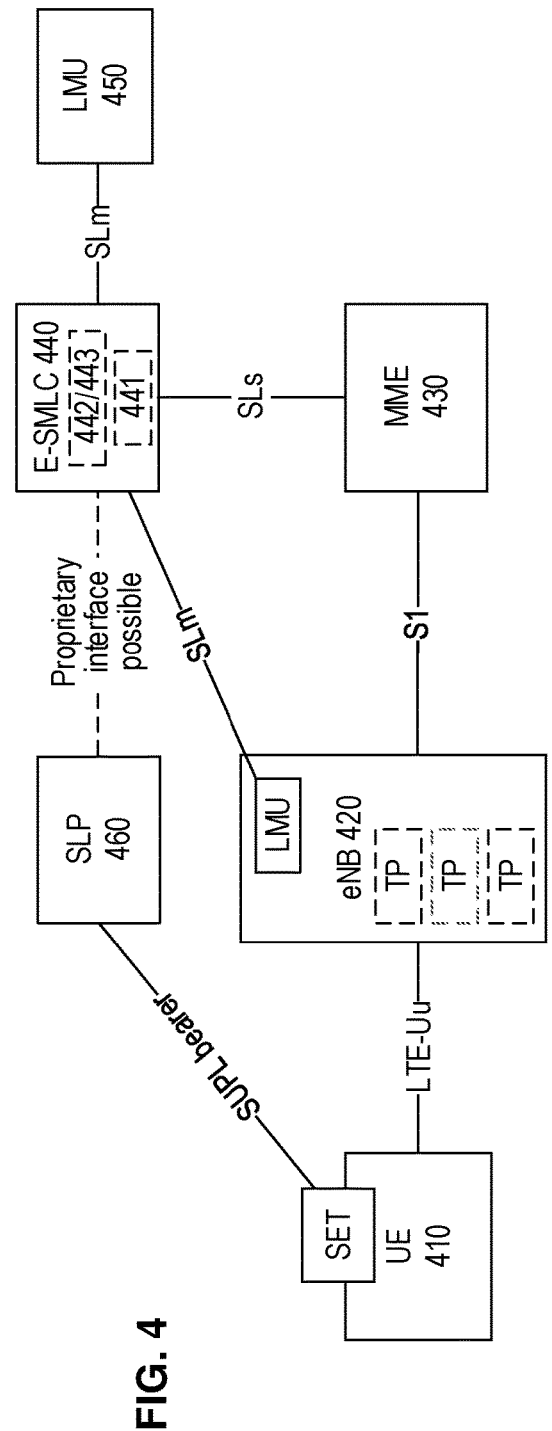

FIG. 4 shows another view of an exemplary positioning architecture in an LTE network. For example, FIG. 4 illustrates how secure user plane location (SUPL) techniques can be supported in LTE networks. In general, SUPL is run on top of the generic LTE user-plane protocol stack. The SUPL solution includes a location server—known as SUPL location platform, SLP (460)—that communicates with a SUPL-enabled terminal (SET), which can be software and/or hardware components of a UE. The SLP also may have a proprietary interface to the E-SMLC (440), which is the location server for control-plane positioning in LTE.

The E-SMLC can communicate with location measurement units (LMUs) via SLm interfaces. As shown in FIG. 4, LMUs can be standalone (e.g., LMU 450) or integrated with an eNB 420. An eNB also may include, or be associated with, one or more transmission points (TPs). The E-SMLC communicates to UEs (e.g., UE 410) via the serving MME (430) and eNB, using the respective SLs, S1, and Uu interfaces shown in FIG. 4. Although not shown, the RRC protocol is used to carry positioning-related information (e.g., to/from E-SMLC) between the UE and the eNB.

E-SMLC 440 can also include, or be associated with, various processing circuitry 442, by which the E-SMLC performs various operations described herein. Processing circuitry 442 can include similar types of processing circuitry as described herein in relation to other network nodes (see, e.g., description of FIG. 15). E-SMLC 440 can also include, or be associated with, a non-transitory computer-readable medium 443 storing instructions (also referred to as a computer program program) that can facilitate the operations of processing circuitry 442. Medium 443 can include similar types of computer memory as described herein in relation to other network nodes (see, e.g., description of FIG. 15). Additionally, E-SMLC 440 can include various communication interface circuitry 441, which can be used, e.g., for communication via the SLs interface. For example, communication interface circuitry 441 can be similar to other interface circuitry described herein in relation to other network nodes (see, e.g., description of FIG. 15).

Figure 5:
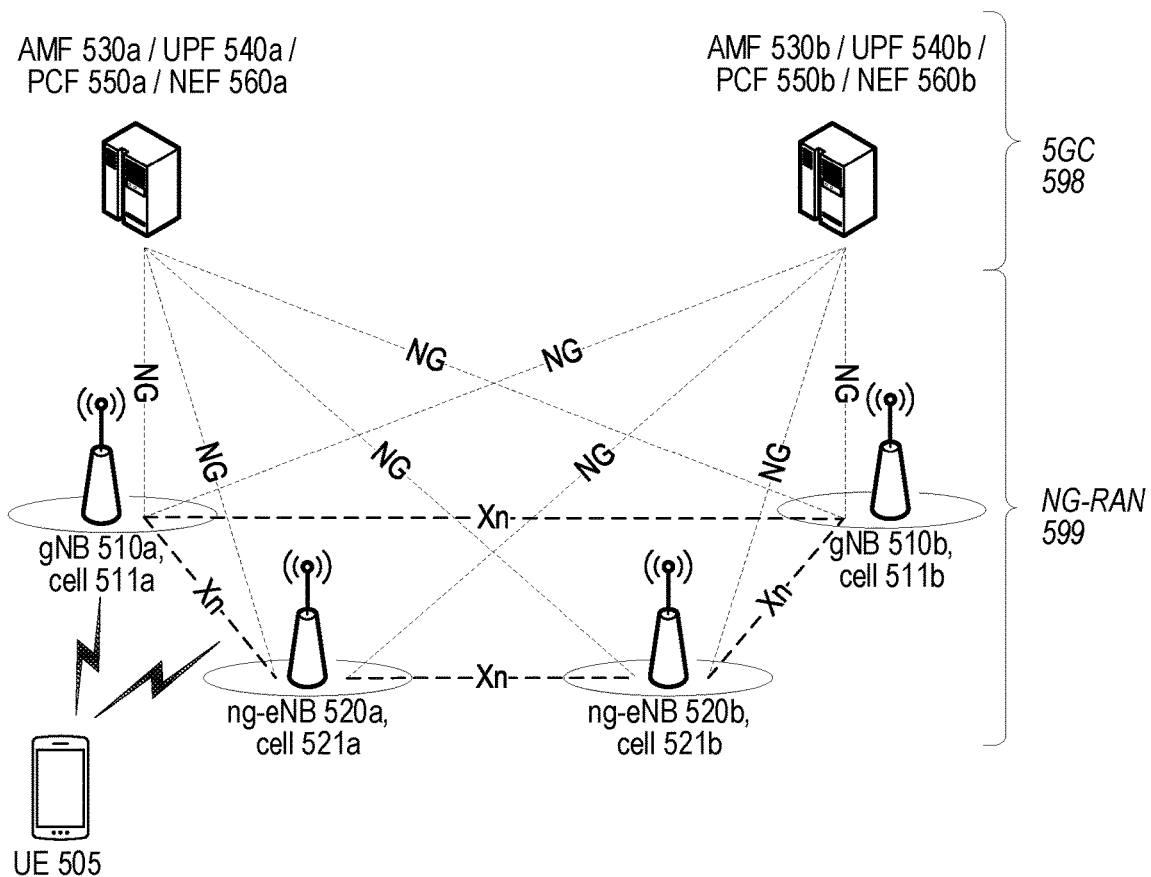
FIG. 5 shows a high-level view of an exemplary 5G/NR network architecture.

FIG. 5 shows a high-level view of an exemplary 5G network architecture, including a Next Generation Radio Access Network (NG-RAN) 599 and a 5G Core (5GC) 598. As shown in the figure, NG-RAN 599 can include gNBs 510 (e.g., 510a,b) and ng-eNBs 520 (e.g., 520a,b) that are interconnected with each other via respective Xn interfaces.

The gNBs and ng-eNBs are also connected via the NG interfaces to 5GC 598, more specifically to the AMF (Access and Mobility Management Function) 550 (e.g., AMFs 530a, b) via respective NG-C interfaces and to the UPF (User Plane Function) 540 (e.g., UPFs 540a,b) via respective NG-U interfaces. Moreover, the AMFs 520a,b can communicate with one or more policy control functions (PCFs, e.g., PCFs 550a,b) and network exposure functions (NEFs, e.g., NEFs 560a,b). The AMFs, UPFs, PCFs, and NEFs are described further below.

Each of the gNBs 510 can support the NR radio interface including frequency division duplexing (FDD), time division duplexing (TDD), or a combination thereof. In contrast, each of ng-eNBs 520 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 511a-b and 521a-b shown as exemplary in FIG. 5. As mentioned above, the gNBs and ng-eNBs can also use various directional beams to provide coverage in the respective cells. Depending on the particular cell in which it is located, a UE 505 can communicate with the gNB or ng-eNB serving that particular cell via the NR or LTE radio interface, respectively.

Each of the gNBs 530 may include and/or be associated with a plurality of Transmission Reception Points (TRPs). Each TRP is typically an antenna array with one or more antenna elements and is located at a specific geographical location. In this manner, a gNB associated with multiple TRPs can transmit the same or different signals from each of the TRPs. For example, a gNB can transmit different version of the same signal on multiple TRPs to a single UE. Each of the TRPs can also employ beams for transmission and reception towards the UEs served by the gNB, as discussed above.

Deployments based on different 3GPP architecture options (e.g., EPC-based or 5GC-based) and UEs with different capabilities (e.g., EPC and 5GC) may coexist at the same time within one network (e.g., PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the core network (CN) by which it is served.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

Figure 6:
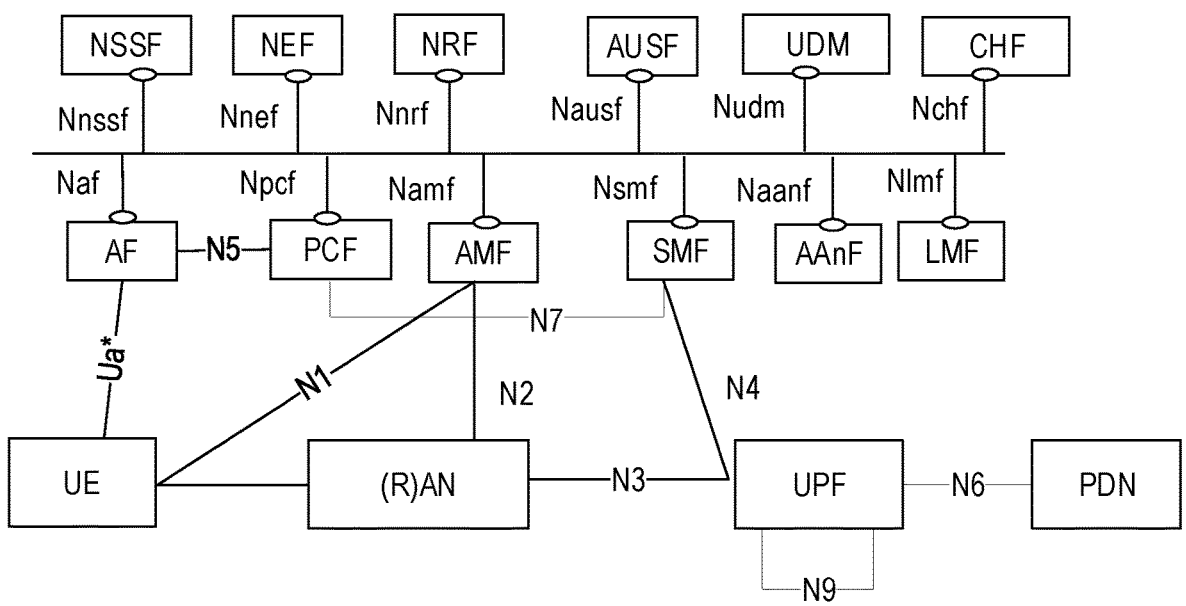
FIG. 6 shows an exemplary non-roaming 5G reference architecture with service-based interfaces and various network functions (NFs).

As discussed above, services can be deployed as part of a network function (NF) in the 5G SBA. This SBA model, which further adopts principles like modularity, reusability and self-containment of NFs, can enable deployments to take advantage of the latest virtualization and software technologies. FIG. 6 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF) with Nupf interface—supports handling of user plane traffic based on the rules received from SMF, including packet inspection and different enforcement actions (e.g., event detection and reporting).

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and handles all mobility and connection management of UEs (similar to MME in EPC).

Network Exposure Function (NEF) with Nnef interface—acts as the entry point into operator's network, by securely exposing to AFs the network capabilities and events provided by 3GPP NFs and by providing ways for the AF to securely provide information to 3GPP network.

Network Repository Function (NRF) with Nnrf interface—provides service registration and discovery, enabling NFs to identify appropriate services available from other NFs. Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Location Management Function (LMF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function shown in FIG. 6 is similar to the HSS in LTE/EPC networks discussed above. UDM supports Generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

Figure 7:
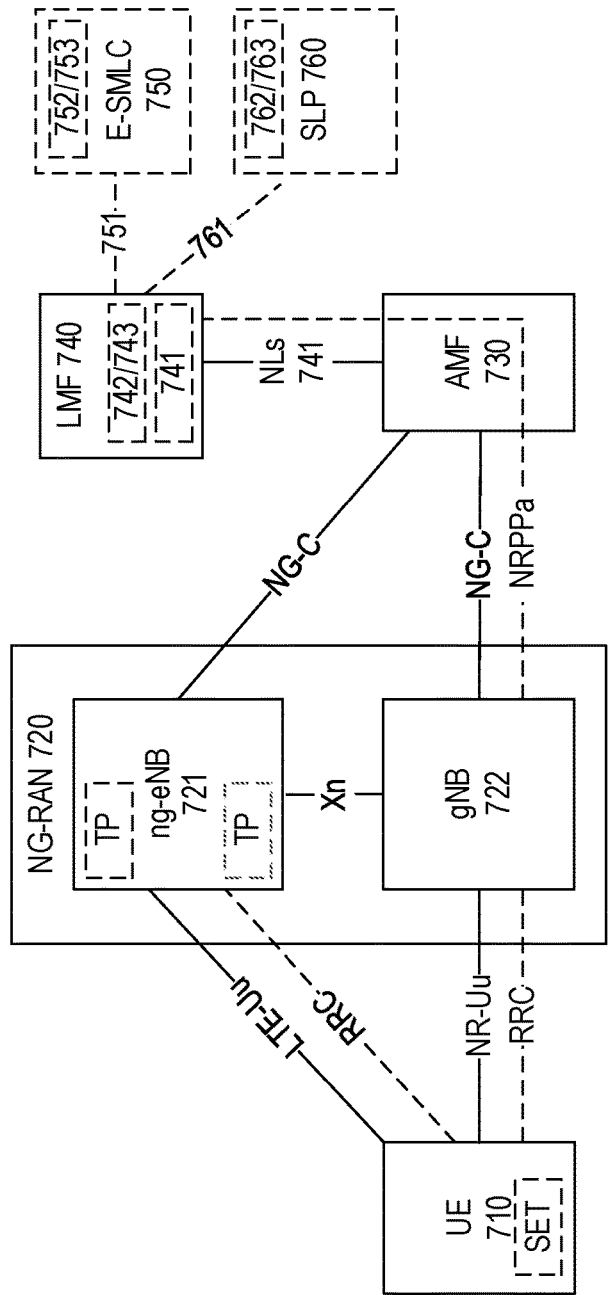
FIG. 7 shows an exemplary positioning architecture for a 5G/NR network.

FIG. 7 is a block diagram illustrating a high-level architecture for supporting UE positioning in NR networks. As shown in FIG. 6, NG-RAN 620 can include nodes such as gNB 722 and ng-eNB 721, similar to the architecture shown in FIG. 5. Each ng-eNB may control several transmission points (TPs), such as remote radio heads. Moreover, some TPs can be "PRS-only" for supporting positioning reference signal (PRS)-based E-UTRAN operation.

In addition, the NG-RAN nodes communicate with an AMF 730 in the 5GC via respective NG-C interfaces (both of which may or may not be present), while AMF 730 and LMF 740 communicate via an NLs interface 741. In addition, positioning-related communication between UE 710 and the NG-RAN nodes occurs via the RRC protocol, while positioning-related communication between NG-RAN nodes and LMF occurs via an NRPPa protocol. Optionally, the LMF can also communicate with an E-SMLC 750 and a SUPL 760 in an LTE network via communication interfaces 751 and 761, respectively. Communication interfaces 751 and 761 can utilize and/or be based on standardized protocols, proprietary protocols, or a combination thereof.

LMF 740 can also include, or be associated with, various processing circuitry 742, by which the LMF performs various operations described herein. Processing circuitry 742 can include similar types of processing circuitry as described herein in relation to other network nodes (see, e.g., description of FIG. 17). LMF 740 can also include, or be associated with, a non-transitory computer-readable medium 743 storing instructions (also referred to as a computer program program) that can facilitate the operations of processing circuitry 742. Medium 743 can include similar types of computer memory as described herein in relation to other network nodes (see, e.g., description of FIG. 17). Additionally, LMF 740 can include various communication interface circuitry 741 (e.g., Ethernet, optical, and/or radio transceivers) that can be used, e.g., for communication via the NLs interface. For example, communication interface circuitry 741 can be similar to other interface circuitry described herein in relation to other network nodes (see, e.g., description of FIG. 17).

Similarly, E-SMLC 750 can also include, or be associated with, various processing circuitry 752, by which the E-SMLC performs various operations described herein. Processing circuitry 752 can include similar types of processing circuitry as described herein in relation to other network nodes (see, e.g., description of FIG. 17). E-SMLC 750 can also include, or be associated with, a non-transitory computer-readable medium 753 storing instructions (also referred to as a computer program program) that can facilitate the operations of processing circuitry 752. Medium 753 can include similar types of computer memory as described herein in relation to other network nodes (see, e.g., description of FIG. 17). E-SMLC 750 can also have communication interface circuitry that is appropriate for communicating via interface 751, which can be similar to other interface circuitry described herein in relation to other network nodes (see, e.g., description of FIG. 17).

Similarly, SLP 760 can also include, or be associated with, various processing circuitry 762, by which the SLP performs various operations described herein. Processing circuitry 662 can include similar types of processing circuitry as described herein in relation to other network nodes (see, e.g., description of FIG. 17). SLP 760 can also include, or be associated with, a non-transitory computer-readable medium 763 storing instructions (also referred to as a computer program program) that can facilitate the operations of processing circuitry 762. Medium 763 can include similar types of computer memory as described herein in relation to other network nodes (see, e.g., description of FIG. 17). SLP 760 can also have communication interface circuitry that is appropriate for communicating via interface 761, which can be similar to other interface circuitry described herein in relation to other network nodes (see, e.g., description of FIG. 17).

In a typical operation, the AMF can receive a request for a location service associated with a particular target UE from another entity (e.g., a gateway mobile location center (GMLC)), or the AMF itself can initiate some location service on behalf of a particular target UE (e.g., for an emergency call from the UE). The AMF then sends a location services (LS) request to the LMF. The LMF processes the LS request, which may include transferring assistance data to the target UE to assist with UE-based and/or UE-assisted positioning; and/or positioning of the target UE. The LMF then returns the result of the LS (e.g., a position estimate for the UE and/or an indication of any assistance data transferred to the UE) to the AMF or to another entity (e.g., GMLC) that requested the LS.

An LMF may have a signaling connection to an E-SMLC, enabling the LMF to access information from E-UTRAN, e.g., to support E-UTRA OTDOA positioning using downlink measurements obtained by a target UE. An LMF can also have a signaling connection to an SLP, the LTE entity responsible for user-plane positioning.

Various interfaces and protocols are used for, or involved in, NR positioning. The LTE Positioning Protocol (LPP) is used between a target device (e.g., UE in the control-plane, or SET in the user-plane) and a positioning server (e.g., LMF in the control-plane, SLP in the user-plane). LPP can use either the control- or user-plane protocols as underlying transport. NRPP is terminated between a target device and the LMF. RRC protocol is used between UE and gNB (via NR radio interface) and between UE and ng-eNB (via LTE radio interface).

Furthermore, the NR Positioning Protocol A (NRPPa) carries information between the NG-RAN Node and the LMF and is transparent to the AMF. As such, the AMF routes the NRPPa PDUs transparently (e.g., without knowledge of the involved NRPPa transaction) over NG-C interface based on a Routing ID corresponding to the involved LMF. More specifically, the AMF carries the NRPPa PDUs over NG-C interface either in UE associated mode or non-UE associated mode. The NGAP protocol between the AMF and an NG-RAN node (e.g., gNB or ng-eNB) is used as transport for LPP and NRPPa messages over the NG-C interface. NGAP is also used to instigate and terminate NG-RAN-related positioning procedures.

LPP/NRPP are used to deliver messages such as positioning capability request, OTDOA positioning measurements request, and OTDOA assistance data to the UE from a positioning node (e.g., location server). LPP/NRPP are also used to deliver messages from the UE to the positioning node including, e.g., UE capability, UE measurements for UE-assisted OTDOA positioning, UE request for additional assistance data, UE configuration parameter(s) to be used to create UE-specific OTDOA assistance data, etc. NRPPa is used to deliver the information between ng-eNB/gNB and LMF in both directions. This can include LMF requesting some information from ng-eNB/gNB, and ng-eNB/gNB providing some information to LMF. For example, this can include information about PRS transmitted by ng-eNB/gNB that are to be used for OTDOA positioning measurements by the UE.

NR networks will support positioning methods similar to LTE E-CID, OTDOA, and UTDOA but based on NR measurements. NR may also support one or more of the following position methods:

Multi-RTT: The device (e.g., UE) computes UE Rx-Tx time difference and gNBs compute gNB Rx-Tx time difference. The results are combined to find the UE position based upon round trip time (RTT) calculation.

DL angle of departure (DL-AoD): gNB or LMF calculates the UE angular position based upon UE DL RSRP measurement results (e.g., of PRS transmitted by network nodes).

UL angle of arrival (UL-AoA): gNB calculates the UL AoA based upon measurements of a UE's UL SRS transmissions.

Each of the NR positioning methods can be supported in UE-assisted, UE-based or UE-standalone modes, similar to LTE discussed above.

Figure 8A:

For any of the above positioning methods, the UE can obtain assistance data via broadcast or unicast. FIG. 8, which includes FIGS. 8A-E, illustrate an exemplary arrangement for a UE (810) to obtain positioning assistance via unicast transmission from a positioning server (820). FIG. 8A shows a flow diagram of various messages between the two entities. Initially, the UE sends a RequestAsssistanceData message to the server, which can be any type of network-based server capable of providing assistance data, such as an E-SMLC, SLP, LMF, etc. The message can be part of the LPP, described above. FIG. 8B shows an ASN.1 data structure defining some exemplary contents of the RequestAsssistanceData message. In particular, the message contains various information elements (IEs) that the UE can use to request different types of assistance data. FIG. 8C shows an ASN.1 data structuring defining a CommonIEsRequestAssistanceData IE that can be included in the RequestAsssistanceData message. This can be used, for example, for the UE to convey the cell global identity (CGI) of its primary serving cell (PCell).

Subsequently, the server responds to the request with a ProvideAssistanceData message, preferably including the requested information. This message can also be part of the LPP. The response can be based on the CGI provided by the UE in the RequestAsssistanceData message. FIG. 8D shows an ASN.1 data structure defining some exemplary contents of the ProvideAssistanceData message. As shown in FIG. 8A, the server optionally sends one or more additional ProvideAssistanceData messages containing additional assistance data.

The contents of the ProvideAssistanceData message will depend on the particular positioning technique. In NR, for example, the UE can be provided with a configuration of DL positioning reference signals (PRS) that the UE can measure. These measurements together with information about the network configuration can be used by the UE or the network estimate the UE's position. The configuration includes information about the Transmission Reception Points (TRPs) that are transmitting the DL PRS, such as their locations, transmit beam information, and relative time differences (RTD) between transmission times of DL PRS. FIG. 8E shows an ASN.1 data structure defining a NR-DL-PRS-ProvideAssistanceData-r16 IE that can be used to convey DL PRS configuration information.

More specifically, the DL-PRS are configured in the following hierarchy:
   One or more frequency layers (1-4 in NR Rel 16);
   One or more TRPs per frequency layer (1-64 in NR Rel 16);
   One or more DL PRS resource sets per TRP (1-2 in NR Rel 16); and
   One or more DL PRS resources per resource set (1-64 in NR Rel 16).
A DL PRS resource can be associated with an antenna beam for directed transmission. Each TRP is associated with one or more identifiers. In NR Rel 16, the UE can be configured with up to 256 TRPs, so an identifier range of 0-255 is typically used.

In addition, or as an alternative, to the unicast operations shown in FIG. 8, a UE can also receive positioning assistance data broadcast by the radio network node (RNN, e.g., eNB, gNB, ng-eNB, etc.) serving the cell in which the UE is located. This information is broadcast as part of the system information (SI) in the cell, such as in a system information block (SIB) dedicated for that purpose. FIG. 9A shows an ASN.1 data structure defining an exemplary SystemInformation-BlockPos-r15 IE through which assistance data can be broadcast. FIG. 9B shows an ASN.1 data structure that further defines the assistanceDataSIBElement-r15 IE included in the exemplary SystemInformationBlockPos-r15. Among other fields, this IE can include an assistanceDataElement octet string and optionally an integer valueTag. Table 1 below further defines the fields shown in FIG. 9B.

TABLE 1 valueTag
This field is used to indicate to the target device any changes
in the broadcast assistance data content. The valueTag
is incremented by one, by the location server, every time
a modified assistance data content is provided. This field
is not included if the broadcast assistance data changes too
frequently. If valueTag and expirationTime are absent,
the UE assumes that the broadcast assistance data content
changes at every broadcast interval.

TABLE 1-continued expiration Time
This field indicates how long the broadcast assistance
data content is valid. It is specified as UTC time and indicates
when the broadcast assistance data content will expire.
cipheringKeyData
If present, indicates that the assistanceDataElement octet string
is ciphered.
segmentationInfo
If present, indicates that the assistanceDataElement is one of many
segments.
assistanceDataElement
The assistanceDataElement OCTET STRING depends on theposSibType
and is specified in 3GPP TS 36.331 Table 7.2-1.
cipherSetID
This field identifies a cipher set comprising a cipher key value and
the first component $C_0$ of the initial counter $C_1$.
d0
This field provides the second component for the initial ciphering
counter $C_1$. This field is defined as a bit string with a length
of 1 to 128 bits. A target device first pads out the bit string if
less than 128 bits with zeroes in least significant bit
positions to achieve 128 bits. $C_1$ is then obtained
from $D_0$ and $C_0$ (defined by the cipherSetID) as:
$C_1 = (D_0 + C_0) \mod 2^{128}$ (with all values treated as non-negative integers).
segmentationOption
Indicates the used segmentation option.
assistanceDataSegmentType
Indicates whether the included assistanceDataElement segment
is the last segment or not.
assistanceDataSegmentNumber
Segment number of the assistanceDataElement segment.
A segment number of zero corresponds to the first segment,
one corresponds to the second segment, and so on.
Segments numbers wraparound should there be more than 64 segments In general, various positioning assistance data can be mapped into segments of the SystemInformationBlockPos-r15 IE according to various arrangements. For example, as shown in FIG. 9C, various assistance data IEs that can be included in the unicast ProvideAssistanceData message can be mapped into various posSibTypex-y fields, where x=1-6 and y can take on one or more values depending on the value of x. Each assistance data element is associated with a valueTag. As a specific example, certain fields of the NR-DL-PRS-ProvideAssistanceData-r16 IE shown in FIG. 8E can be mapped to fields posSibType6-y, where y=2-3.

Even if such fields can be included in broadcast SI, the limited broadcast capacity makes it much less certain that they will. In other words, it is likely that broadcast SI will include (at best) a limited set of assistance data, such that the UE will often be forced to obtain needed assistance data via unicast. Furthermore, some parts of the assistance data are semi-static and/or valid for a relatively long duration, while other parts may be valid for a much shorter duration. If a UE previously obtained some semi-static assistance data, the UE does not need to obtain the same assistance data if it is still valid. However, a UE currently has no way to determine whether previously obtained assistance data is still valid, or whether such assistance data has been updated such that the UE needs to obtain the updated version. As such, the UE faces the choice of always requesting semi-static assistance data to ensure it has the most recent version or refraining from requesting such data in hopes that no updates have occurred and the version it holds is still valid.

Broadcast assistance data sent by LMF to UE is transparent to the UE's serving radio network node (e.g., eNB, gNB). This hinders on-demand positioning, since the UE has to read valueTag or expiryDuration associated with each posSIBTypex-y included in the broadcast to understand whether the AD content is persistent.

Embodiments of the present disclosure can address these and other issues, problems, and/or difficulties by the network providing persistence indicator of whether certain assistance data has changed. By obtaining and utilizing this indication, a UE can request the relevant assistance data when a change is indicated but can refrain from requesting such assistance data when a change is not indicated. Advantages include more efficient distribution of assistance data by the network (e.g., using fewer network resources), as well as reducing the risk that a UE performs incorrect measurements and/or position estimates based on invalid assistance data.

Figure 10:
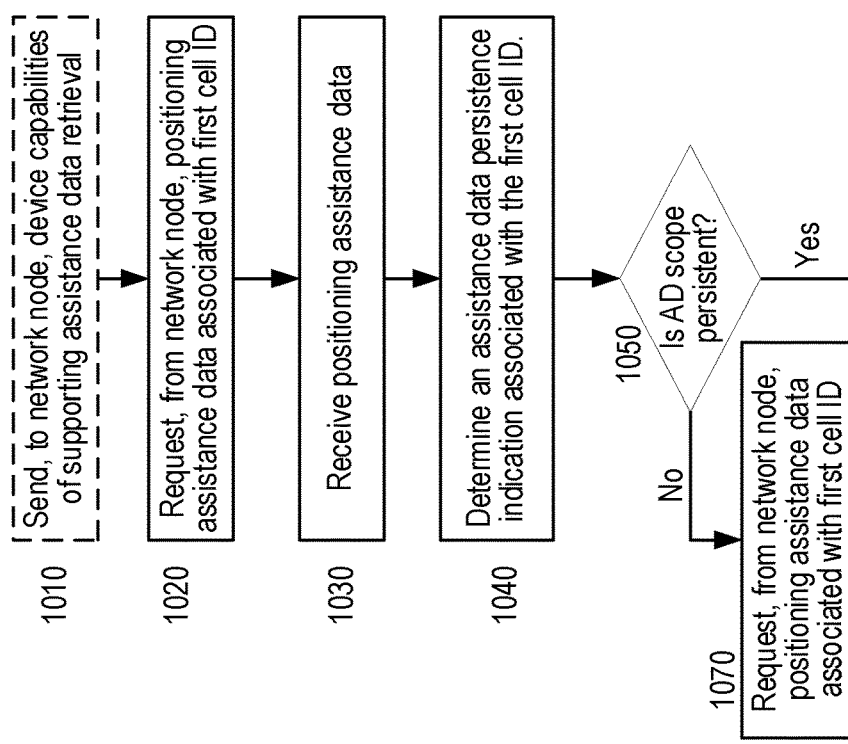
FIG. 10 is a flow diagram illustrating certain operations performed by UEs, according to various exemplary embodiments of the present disclosure.

Certain embodiments include methods (e.g., procedures) performed by a UE (e.g., wireless device), as well as UEs configured to perform such methods. FIG. 10 shows a flow diagram that illustrates certain operations performed by UEs, according to these embodiments. Although FIG. 10 shows specific blocks in a particular order, the operations can be performed in a different order than shown and can be combined and/or divided into blocks having different functionality than shown. Optional operations are indicated by dashed lines.

In operation 1010, the UE optionally sends, to a positioning node (e.g., LMF, E-SMLC, etc.), capability information related to positioning assistance data provisioning. In operation 1020, the UE requests, from the positioning node, positioning assistance data associated with a first cell ID (e.g., CGI). The UE may have previously obtained the first cell ID, via broadcast SI in the cell. The request may be a RequestPositioningAssistance message, discussed above, and may include the first cell ID.

In operation 1030, the UE receives, from a positioning node, a response including the requested positioning assistance data. The response may be a ProvidePositioningAssistance message, discussed above, and may include the first cell ID. Subsequently, enough time passes such that there may be some uncertainty about the validity of the previously obtained positioning assistance data. In operation 1040, the UE again obtains the first cell ID, such as by returning to the first cell and obtaining it via broadcast SI. The UE determines a persistence indicator for the assistance data associated with the first cell ID. In operation 1050, based on the persistence indicator, the UE determines if the assistance data scope is persistent, e.g., if the assistance data is still valid. If the assistance data scope is persistent, the UE refrains from requesting assistance data from the positioning node (operation 1060), but if the assistance data scope is not persistent, the UE requests assistance data associated with the first cell ID from the positioning node (operation 1070).

Figure 11:
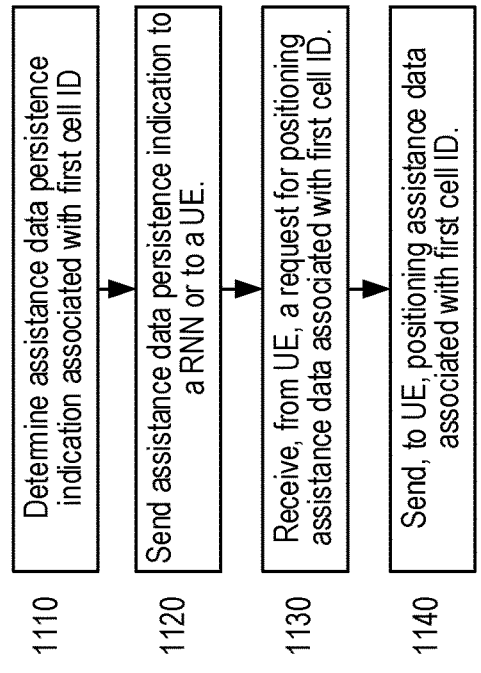
FIG. 11 is a flow diagram illustrating certain operations performed by positioning nodes (e.g., LMF, E-SMLC, SLP), according to various exemplary embodiments of the present disclosure.

Other embodiments include methods (e.g., procedures) performed by a positioning node (e.g., LMF, E-SMLC, etc.), as well as positioning nodes configured to perform such methods. FIG. 11 shows a flow diagram that illustrates certain operations performed by a positioning node, according to these embodiments. Although FIG. 11 shows specific blocks in a particular order, the operations can be performed in a different order than shown and can be combined and/or divided into blocks having different functionality than shown. Optional operations are indicated by dashed lines.

In operation 1110, the positioning node determines a persistence indicator associated with a first cell ID, e.g., associated with a cell served by a radio network node (RNN, e.g., eNB, gNB, etc.). This can be done in various ways, described below. In operation 1120, the positioning node sends the assistance data persistence indicator to a UE and/or to the RNN. In operation 1130, the positioning node receives, from the UE, a request for positioning assistance data associated with the first cell ID. The request may be a RequestPositioningAssistance message, such as discussed above. The UE may include the first cell ID in the request. In operation 1140, the positioning node sends, to the UE, a response including the requested positioning assistance data. The response may be a ProvidePositioningAssistance message, such as discussed above, and may include the first cell ID.

Figure 12:
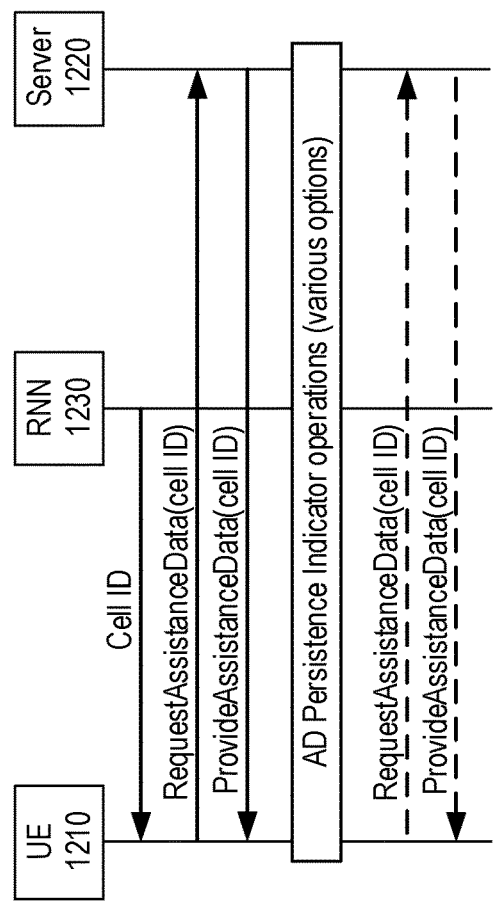
FIG. 12 is a signal flow diagram illustrating messaging and operations by a UE, a positioning node (e.g., LMF, E-SMLC, SLP), and a radio network node (RNN, e.g., eNB, gNB, etc.), according to various exemplary embodiments of the present disclosure.

These embodiments are further illustrated by FIG. 12, which is a signal flow diagram illustrating messaging and operations by a UE (1210), a server (1230, e.g., positioning node), and a RNN (1220). Although FIG. 12 shows specific operations in a particular order, the operations can be performed in a different order than shown and can be combined and/or divided into operations having different functionality than shown. Optional operations are indicated by dashed lines.

Initially, the UE obtains a cell ID associated with a cell served by the RNN. This can be the first cell ID mentioned above. Subsequently, the UE requests assistance data from the server and provides the obtained cell ID in the request. The server then responds with the requested assistance data, optionally also including the cell ID. The request and response can be those described above in relation to FIGS. 10-11. Subsequently, the server, the UE, and optionally the RNN can perform various operations related to the persistence indicator associated with the cell ID. For example, the UE can determine the persistence indicator from the server. If the persistence indicator indicates that the assistance data is not persistent, the UE can again request assistance data associated with the cell ID from the server; otherwise, the UE refrains from making this request. As such, the second request/response pair are indicated as optional by dashed lines.

According to some embodiments, the assistance data can be segmented into two parts: a first part that is semi-static and is valid for a relatively long duration, and a second part that is more dynamic, changes more frequently, and/or is valid for a relatively short duration. In such embodiments, the first part can be provided to UEs via unicast request/response, while the second part can be provided via broadcast SI.

FIG. 13, which includes FIGS. 13A-C, shows various aspects of an exemplary arrangement for segmenting the NR-DL-PRS-ProvideAssistanceData-r16 IE (see FIG. 8E) into a first part and a second part. As shown in FIG. 13A, the NR-DL-PRS-AssistanceDataList and UEB-NR-TRP-LocationInfo fields are delivered via unicast request request/response, and the UEB-NR-TRP-RTDInfo field is delivered by broadcast SI (e.g., in field posSibType6-3). The UEB-NR-TRP-RTDInfo field represents relative time difference (RTD) between TRPs, resource sets, and resources and, in general, changes more frequently than the other two fields of the IE. FIG. 13B shows an exemplary ASN.1 data structure for the unicast NR-DL-PRS-ProvideAssistanceData-r16 IE according to these embodiments.

In general, if a UE has requested and received assistance data in a cell associated with a cell ID, it can store and continue using such assistance data as long as the assistance data scope is considered persistent. This means that if the UE leaves the cell and returns, it can still use the assistance data associated with this cell if it is still persistent. On the other hand, if the data is not persistent, then the UE need to retrieve new assistance data, e.g., via unicast request/response.

In some embodiments, the UE can determine a persistence indicator based on the list of TRPs in the broadcast second part and the list of TRPs in the first part previously received via unicast. For example, the UE can determine that the assistance data scope is persistent when the number of TRPs is the same in the unicast and the broadcast, and that the assistance data scope is not persistent if the number of TRPs is different in the unicast and the broadcast. As another example, the UE can determine that the assistance data scope is persistent if the number of TRPs and the TRP IDs are the same in the unicast and the broadcast, and that the assistance data scope is not persistent if the number of TRPs and/or the TRP IDs is different in the unicast and the broadcast.

FIG. 13C shows a specific example of these embodiments in relation to FIG. 13A. In particular, one of the TRP IDs has changed in the broadcast SI as compared to the TRP IDs of the assistance data received earlier via unicast. Based on reading the broadcast SI, the UE can determine that the assistance data scope is not persistent.

In other embodiments, the UE can determine a persistence indicator based on a valueTag associated with the broadcast assistance data. A valueTag is a number that can be provided with broadcast assistance data to inform UEs about changes to the broadcast assistance data scope. In general, the valueTag be viewed as a version number of the broadcast assistance data. In these embodiments, however, the broadcast valueTag is also used to indicated changes in the assistance data previously received via unicast for the same cell. For example, if the valueTag is the same as when the assistance data was received via unicast, the UE determines that the assistance data scope is persistent, while if the valueTag is different compared to when the assistance data was received via unicast, the UE determines that the assistance data scope is not persistent.

In other embodiments, the persistence indicator can be explicit, e.g., a broadcast indicator to inform that the assistance data provided via unicast has changed. This could be realized as a broadcast valueTag that is incremented every time the semi-static assistance data provided via unicast has changed.

In other embodiments, both the first and second parts of the assistance data can be provided via broadcast, with the semi-static first part only broadcast on demand and/or request by one or more UEs and the dynamic second part always broadcast. The on-demand assistance data can be associated with a broadcast valueTag that is incremented upon every change to semi-static assistance data provided via on-demand broadcast. A modulus (e.g., wraparound to zero) based on the size of valueTag can also be employed.

As shown in FIG. 12, the assistance data is generated by a server (e.g., positioning node) and provided to the UE by either broadcast or unicast—both cases are transparent to the RNN serving the UE's current cell. In some embodiments, whenever relevant assistance data content is updated, the positioning node provides new assistance data to the RNN for broadcast in the cells served by the RNN. The RNN timestamps the assistance data upon receipt from the positioning node, and provides this timestamp in a broadcast SIB. UE's that are interested in the assistance data can first read the timestamp, request updated assistance data if the previously received first part is older than the timestamp, and refrain from requesting updated assistance data if the previously received first part is more recent than the timestamp. In some embodiments, a single timestamp can be maintained for all semi-static assistance data, for all semi-static assistance data associated with each positioning method (e.g., GNSS, OTDOA), etc. In some embodiments, the timestamp can also be associated with a valueTag maintained by the RNN.

In some embodiments, the UE can also base the determination of the persistence indicator (e.g., for the unicast first part) on the expirationTime included in the broadcast assistance data (e.g., associated with the second part). For example, the UE can refrain from requesting the first part until after the expirationTime associated with the second part.

In some embodiments, an area scope can also be associated with the assistance data. The area scope can indicate that the assistance is valid in additional cells other than the UE's current cell. In other words, the area scope can indicate an area of validity for the first part. The area scope can be a list of cells, a location area, a tracking area, a geographic boundary, etc. According to these embodiments, the UE can also base the determination of the persistence indicator also on the area scope. For example, the UE can determine that assistance data obtained via unicast while in cell 1 is persistent at a later time in cell 2, so long as both cells are in the area scope.

In some embodiments, a UE can perform measurements and/or determine its own position based on the two parts of the assistance data received in any manner described above. In general, UEs operating in this manner can include a processing circuit, a memory, and a radio transceiver circuit. The processing circuit and radio transceiver circuits can operate cooperatively to receive the assistance data, including the determination of the assistance data persistence indicator and responsive operations. The memory can configured to store received assistance data. The radio transceiver circuit can be configured to support radio signal measurements partly based on the assistance data. In some cases, the processing circuit can be configured to determine the UE's position based on the assistance data and the measurements. The above-described capabilities and/or functions performed by the UE can be combined with other capabilities and/or functions typically found in UEs, such as described in more detail below.

In various embodiments described above, the persistence indicator can be determined by the UE based on an explicit indication or based on other information contained in and/or associated with broadcast assistance data. If based on an explicit indication, such an indication can be provided to the RNN (e.g., gNB, eNB) associated with the UE's serving cell by a positioning node (e.g., LMF, E-SMLC, SLP), together with assistance data broadcast by the RNN in a cell.

Figure 14:
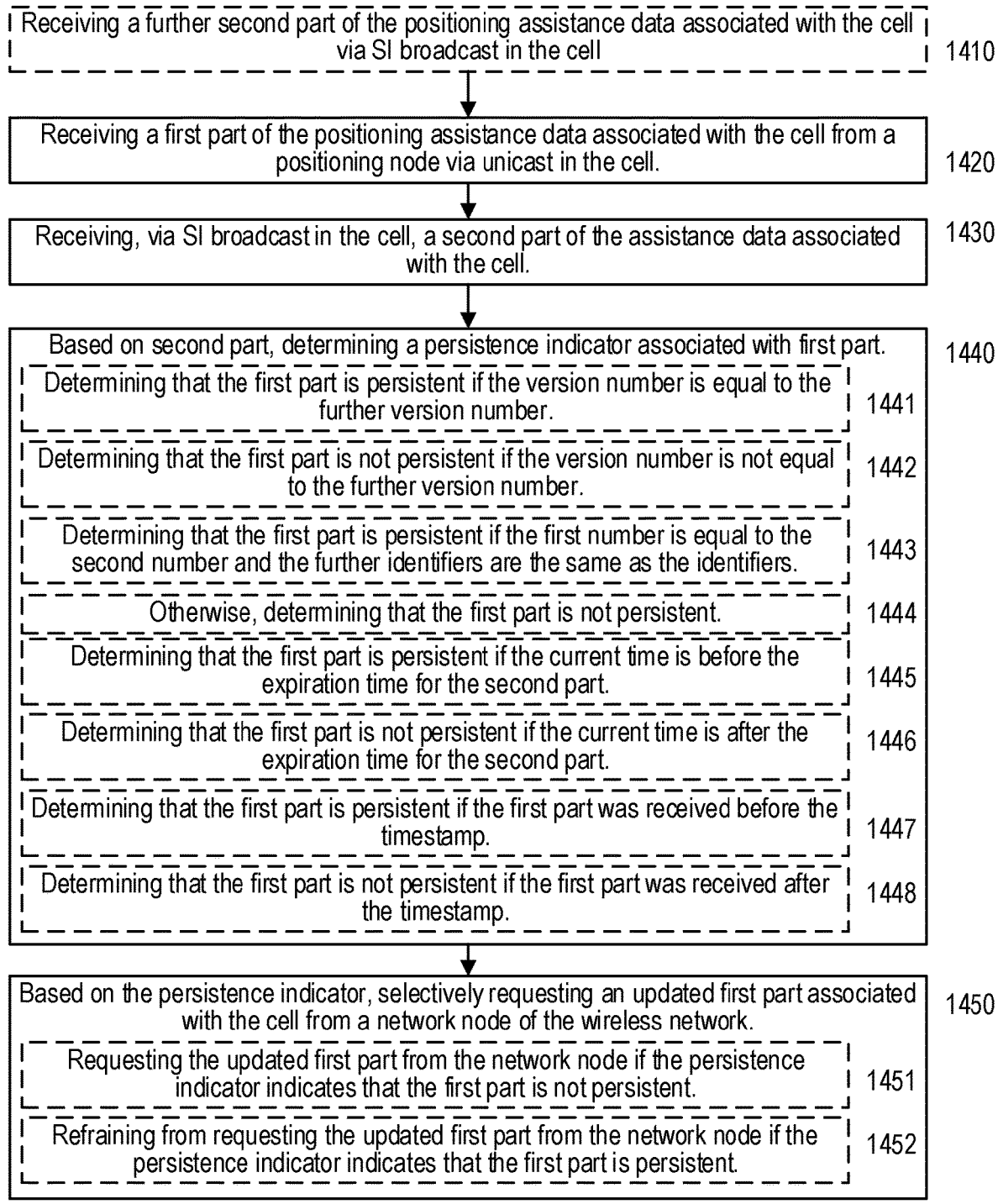
FIG. 14 is a flow diagram illustrating exemplary methods (e.g., procedures) for a UE (e.g., wireless device, IoT device, etc. or component thereof), according to various exemplary embodiments of the present disclosure.
Figure 15:
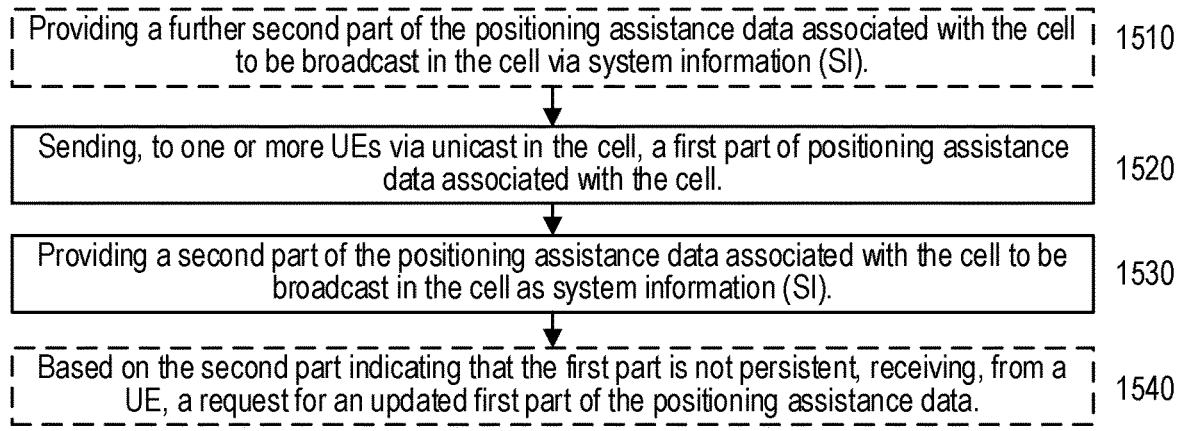
FIG. 15 is a flow diagram illustrating exemplary methods (e.g., procedures) for a positioning node (e.g., E-SMLC, SMLC, LMF, etc. or component thereof) according to various exemplary embodiments of the present disclosure.

The embodiments described above can be further illustrated by the embodiments shown in FIGS. 14-15, which depict exemplary methods (e.g., procedures) performed by a UE and a positioning node, respectively. In other words, various features of the operations described below with reference to FIGS. 14-15 correspond to various embodiments described above. The exemplary methods shown in FIGS. 14-15 can be used cooperatively to provide various exemplary benefits described herein. Although FIGS. 14-15 shows specific blocks in particular orders, the operations of the blocks can be performed in different orders than shown and can be combined and/or divided into blocks having different functionality than shown. Optional blocks or operations are indicated by dashed lines.

In particular, FIG. 14 is a flow diagram illustrating an exemplary method (e.g., procedure) to obtain positioning assistance data associated with a cell of a wireless network, according to various exemplary embodiments of the present disclosure. The exemplary method shown in FIG. 14 can be implemented by a UE (e.g., wireless device, IoT device, etc. or component thereof) such as described in relation to other figures herein.

The exemplary method can include the operations of block 1420, in which the UE can receive a first part of the positioning assistance data associated with the cell from a positioning node via unicast in the cell. The exemplary method can also include the operations of block 1430, in which the UE can receive a second part of the positioning assistance data associated with the cell via system information (SI) broadcast in the cell. The exemplary method can also include the operations of block 1440, in which the UE can, based on the second part, determine a persistence indicator associated with the first part. The exemplary method can also include the operations of block 1450, in which the UE can, based on the persistence indicator, selectively request an updated first part associated with the cell from a network node of the wireless network.

In various embodiments, the operations of block 1430 can be performed before, after, or substantially concurrent with the operations of block 1420.

In some embodiments, the selectively requesting operations of block 1450 can include the operations of sub-blocks 1451-1452. In sub-block 1451, the UE can request an updated first part from the network node when the persistence indicator indicates that the first part is not persistent. In sub-block 1452, the UE can refrain from requesting an updated first part from the network node when the persistence indicator indicates that the first part is persistent.

In some embodiments, the network node is a radio network node (RNN) serving the cell and the updated first part is requested for delivery via on-demand SI broadcast in the cell. In other embodiments, the network node is the positioning node (e.g., LMF). For example, in these embodiments, the first part can be requested for delivery from the positioning node via unicast in the cell.

In some embodiments, the second part can include an explicit persistence indicator for the first part. In such case, the UE can determine persistence directly from this indicator.

In some embodiments, the exemplary method can also include the operations of block 1410, where the UE can, before receiving the second part (e.g., in block 1430), receive a further second part of the positioning assistance data associated with the cell via SI broadcast in the cell.

In some of these embodiments, the second part includes an associated version number and the further second part includes an associated further version number. In such embodiments, the determining operations of block 1450 can include the operations of sub-blocks 1451-1452, where the UE can determine that the first part is persistent when the version number is equal to the further version number and determine that the first part is not persistent when the version number is not equal to the further version number.

In other of these embodiments, the second part includes a first number of identifiers of transmission sources of positioning signals and the further second part includes a second number of further identifiers of transmission sources of positioning signals. In such embodiments, the determining operations of block 1450 can include the operations of sub-blocks 1453-1454, where the UE can determine that the first part is persistent when the first number is equal to the second number and the further identifiers are the same as the identifiers, and otherwise determine that the first part is not persistent.

In some embodiments, the second part includes an associated expiration time. In such embodiments, the second part is received before the first part and the determining operations of block 1450 can include the operations of sub-blocks 1455-1456. In sub-block 1455, the UE can determine that the first part is persistent when the current time is before the expiration time associated with the second part. In sub-block 1456, the UE can determine that the first part is not persistent when the current time is after the expiration time associated with the second part.

In other embodiments, the second part includes a timestamp indicating when the second part was received, from the network node, by a radio network node (RNN) that broadcasts the SI in the cell. In such embodiments, the first part is received before the second part and the determining operations of block 1450 can include the operations of sub-blocks 1457-1458. In sub-block 1457, the UE can determine that the first part is persistent when the first part was received before the timestamp. In sub-block 1458, the UE can determine that the first part is not persistent when the first part was received after the timestamp.

In some embodiments, the first part can include an associated area of validity. In such embodiments, the determining operations in block 1450 can be further based on whether the cell (e.g., from which the UE receives the second part by SI) is within the area of validity. For example, any of the determinations that the first part is persistent can also be conditioned on the cell being within the area of validity.

In some embodiments, the first part and the second part are assistance data for a single positioning method, e.g., UE-based observed time difference of arrival (OTDOA). According to that example, the second part can include relative time difference (RTD) between transmission times of downlink positioning reference signals (DL PRS) from a plurality of sources (e.g., TRPs) in the wireless network. Likewise, the first part can include locations of the plurality of sources, which can change less frequently than the RTDs.

In addition, FIG. 15 is a flow diagram illustrating an exemplary method (e.g., procedure) to provide positioning assistance data to UEs operating in a cell of the wireless network, according to various exemplary embodiments of the present disclosure. The exemplary method shown in FIG. 15 can be implemented, for example, a positioning node (e.g., E-SMLC, SLP, LMF, etc.) described in relation to other figures herein.

The exemplary method can include the operations of block 1520, in which the positioning node can send, to one or more UEs via unicast in the cell, a first part of positioning assistance data associated with the cell. The exemplary method can include the operations of block 1530, in which the positioning node can provide a second part of the positioning assistance data associated with the cell to be broadcast in the cell as system information (SI). For example, the positioning node can send the second part to a radio network node (RNN) serving the cell. The second part can include information that facilitates UE determination of a persistence indicator associated with the first part, such as described above.

In various embodiments, the operations of block 1530 can be performed before, after, or substantially concurrent with the operations of block 1520.

In some embodiments, the second part can include an explicit persistence indicator for the first part. In such case, UEs can determine persistence directly from this indicator.

In other embodiments the exemplary method can also include the operations of block 1510, in which the network node can, before providing the second part, provide a further second part of the assistance data associated with the cell to be broadcast in the cell via SI.

In some of these embodiments, the second part includes an associated version number and the further second part includes an associated further version number. UEs can determine the persistence indicator from these version numbers, as described above.

In other of these embodiments, the second part includes a first number of identifiers of transmission sources of positioning signals and the further part includes a second number of further identifiers of transmission sources of positioning signals. UEs can determine the persistence indicator based on first number, second number, the identifiers, and the further identifiers, as described above.

In some embodiments, the second part includes an expiration time for the second part and the second part is provided for broadcast before sending the first part. UEs can determine the persistence indicator based on the expiration time, as described above.

In some embodiments, the first part also includes an associated area of validity, which UEs can use to determine the persistence indicator, as described above.

In some embodiments, the first part and the second part are assistance data for a single positioning method, e.g., UE-based observed time difference of arrival (OTDOA). According to that example, the second part can include relative time difference (RTD) between transmission times of downlink positioning reference signals (DL PRS) from a plurality of sources (e.g., TRPs) in the wireless network. Likewise, the first part can include locations of the plurality of sources, which can change less frequently than the RTDs.

In some embodiments, the exemplary method can also include the operations of block 1540, in which the network node can receive from a UE a request for an updated first part of the positioning assistance data associated with the cell. This request can be based on the second part indicating that the first part is not persistent.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 16:
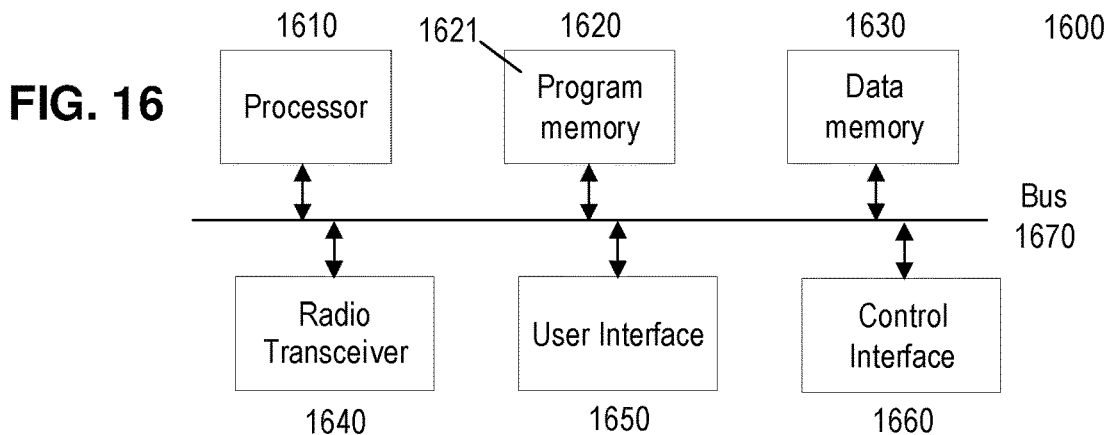
FIG. 16 is a block diagram of an exemplary wireless device or UE, according to various exemplary embodiments of the present disclosure.

FIG. 16 shows a block diagram of an exemplary wireless device or user equipment (UE) 1600 (hereinafter referred to as "UE 1600") according to various embodiments of the present disclosure, including those described above with reference to other figures. For example, UE 1600 can be configured by execution of instructions, stored on a computer-readable medium, to perform operations corresponding to one or more of the exemplary methods described herein.

UE 1600 can include a processor 1610 (also referred to as "processing circuitry") that can be operably connected to a program memory 1620 and/or a data memory 1630 via a bus 1670 that can comprise parallel address and data buses, serial ports, or other methods and/or structures known to those of ordinary skill in the art. Program memory 1620 can store software code, programs, and/or instructions (collectively shown as computer program product 1621 in FIG. 16) that, when executed by processor 1610, can configure and/or facilitate UE 1600 to perform various operations, including operations corresponding to various exemplary methods described herein. As part of or in addition to such operations, execution of such instructions can configure and/or facilitate UE 1600 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1640, user interface 1650, and/or control interface 1660.

As another example, processor 1610 can execute program code stored in program memory 1620 that corresponds to MAC, RLC, PDCP, and RRC layer protocols standardized by 3GPP (e.g., for NR and/or LTE). As a further example, processor 1610 can execute program code stored in program memory 1620 that, together with radio transceiver 1640, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1610 can execute program code stored in program memory 1620 that, together with radio transceiver 1640, implements device-to-device (D2D) communications with other compatible devices and/or UEs.

Program memory 1620 can also include software code executed by processor 1610 to control the functions of UE 1600, including configuring and controlling various components such as radio transceiver 1640, user interface 1650, and/or control interface 1660. Program memory 1620 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1620 can comprise an external storage arrangement (not shown) remote from UE 1600, from which the instructions can be downloaded into program memory 1620 located within or removably coupled to UE 1600, so as to enable execution of such instructions.

Data memory 1630 can include memory area for processor 1610 to store variables used in protocols, configuration, control, and other functions of UE 1600, including operations corresponding to, or comprising, any of the exemplary methods described herein. Moreover, program memory 1620 and/or data memory 1630 can include non-volatile memory (e.g., flash memory), volatile memory (e.g., static or dynamic RAM), or a combination thereof. Furthermore, data memory 1630 can comprise a memory slot by which removable memory cards in one or more formats (e.g., SD Card, Memory Stick, Compact Flash, etc.) can be inserted and removed.

Persons of ordinary skill will recognize that processor 1610 can include multiple individual processors (including, e.g., multi-core processors), each of which implements a portion of the functionality described above. In such cases, multiple individual processors can be commonly connected to program memory 1620 and data memory 1630 or individually connected to multiple individual program memories and or data memories. More generally, persons of ordinary skill in the art will recognize that various protocols and other functions of UE 1600 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1640 can include radio-frequency transmitter and/or receiver functionality that facilitates the UE 1600 to communicate with other equipment supporting like wireless communication standards and/or protocols. In some exemplary embodiments, the radio transceiver 1640 includes one or more transmitters and one or more receivers that enable UE 1600 to communicate according to various protocols and/or methods proposed for standardization by 3GPP and/or other standards bodies. For example, such functionality can operate cooperatively with processor 1610 to implement a PHY layer based on OFDM, OFDMA, and/or SC-FDMA technologies, such as described herein with respect to other figures.

In some exemplary embodiments, radio transceiver 1640 includes one or more transmitters and one or more receivers that can facilitate the UE 1600 to communicate with various LTE, LTE-Advanced (LTE-A), and/or NR networks according to standards promulgated by 3GPP. In some exemplary embodiments of the present disclosure, the radio transceiver 1640 includes circuitry, firmware, etc. necessary for the UE 1600 to communicate with various NR, NR-U, LTE, LTE-A, LTE-LAA, UMTS, and/or GSM/EDGE networks, also according to 3GPP standards. In some embodiments, radio transceiver 1640 can include circuitry supporting D2D communications between UE 1600 and other compatible devices.

In some embodiments, radio transceiver 1640 includes circuitry, firmware, etc. necessary for the UE 1600 to communicate with various CDMA2000 networks, according to 3GPP2 standards. In some embodiments, the radio transceiver 1640 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1640 can include a transceiver that is capable of wired communication, such as by using IEEE 802.3 Ethernet technology. The functionality particular to each of these embodiments can be coupled with and/or controlled by other circuitry in the UE 1600, such as the processor 1610 executing program code stored in program memory 1620 in conjunction with, and/or supported by, data memory 1630.

User interface 1650 can take various forms depending on the particular embodiment of UE 1600, or can be absent from UE 1600 entirely. In some embodiments, user interface 1650 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1600 can comprise a tablet computing device including a larger touchscreen display. In such embodiments, one or more of the mechanical features of the user interface 1650 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1600 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1600 having a touch screen display are capable of receiving user inputs, such as inputs related to exemplary methods described herein or otherwise known to persons of ordinary skill.

In some embodiments, UE 1600 can include an orientation sensor, which can be used in various ways by features and functions of UE 1600. For example, the UE 1600 can use outputs of the orientation sensor to determine when a user has changed the physical orientation of the UE 1600's touch screen display. An indication signal from the orientation sensor can be available to any application program executing on the UE 1600, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1660 of the UE 1600 can take various forms depending on the particular exemplary embodiment of UE 1600 and of the particular interface requirements of other devices that the UE 1600 is intended to communicate with and/or control. For example, the control interface 1660 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1660 can comprise an IEEE 802.3 Ethernet interface such as described above. In some exemplary embodiments of the present disclosure, the control interface 1660 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1600 can comprise more functionality than is shown in FIG. 16 including, for example, a video and/or still-image camera, microphone, media player and/or recorder, etc. Moreover, radio transceiver 1640 can include circuitry necessary to communicate using additional radio-frequency communication standards including Bluetooth, GPS, and/or others. Moreover, the processor 1610 can execute software code stored in the program memory 1620 to control such additional functionality. For example, directional velocity and/or position estimates output from a GPS receiver can be available to any application program executing on the UE 1600, including any program code corresponding to and/or embodying any exemplary embodiments (e.g., of methods) described herein.

Figure 17:
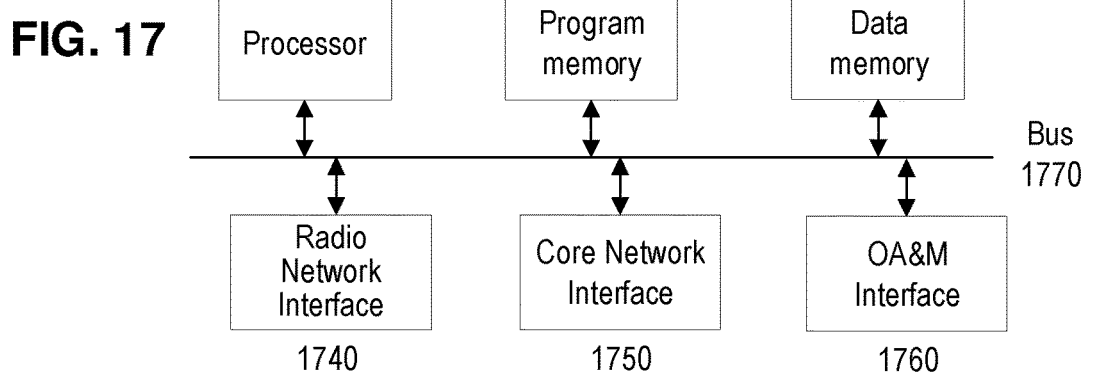
FIG. 17 is a block diagram of an exemplary network node (e.g., a base station, eNB, gNB, etc.), according to various exemplary embodiments of the present disclosure.

FIG. 17 shows a block diagram of an exemplary network node 1700 according to various embodiments of the present disclosure, including those described above with reference to other figures. For example, exemplary network node 1700 can be configured by execution of instructions, stored on a computer-readable medium, to perform operations corresponding to one or more of the exemplary methods described herein. In some exemplary embodiments, network node 1700 can comprise a base station, eNB, gNB, or one or more components thereof. For example, network node 1700 can be configured as a central unit (CU) and one or more distributed units (DUs) according to NR gNB architectures specified by 3GPP. More generally, the functionally of network node 1700 can be distributed across various physical devices and/or functional units, modules, etc.

Network node 1700 can include processor 1710 (also referred to as "processing circuitry") that is operably connected to program memory 1720 and data memory 1730 via bus 1770, which can include parallel address and data buses, serial ports, or other methods and/or structures known to those of ordinary skill in the art.

Program memory 1720 can store software code, programs, and/or instructions (collectively shown as computer program product 1721 in FIG. 17) that, when executed by processor 1710, can configure and/or facilitate network node 1700 to perform various operations, including operations corresponding to various exemplary methods described herein. As part of and/or in addition to such operations, program memory 1720 can also include software code executed by processor 1710 that can configure and/or facilitate network node 1700 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1740 and/or core network interface 1750. By way of example, core network interface 1750 can comprise the S1 or NG interface and radio network interface 1740 can comprise the Uu interface, as standardized by 3GPP. Program memory 1720 can also comprise software code executed by processor 1710 to control the functions of network node 1700, including configuring and controlling various components such as radio network interface 1740 and core network interface 1750.

Data memory 1730 can comprise memory area for processor 1710 to store variables used in protocols, configuration, control, and other functions of network node 1700. As such, program memory 1720 and data memory 1730 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1710 can include multiple individual processors (not shown), each of which implements a portion of the functionality described above. In such case, multiple individual processors may be commonly connected to program memory 1720 and data memory 1730 or individually connected to multiple individual program memories and/or data memories. More generally, persons of ordinary skill will recognize that various protocols and other functions of network node 1700 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1740 can comprise transmitters, receivers, signal processors, ASICs, antennas, beamforming units, and other circuitry that enables network node 1700 to communicate with other equipment such as, in some embodiments, a plurality of compatible user equipment (UE). In some embodiments, interface 1740 can also enable network node 1700 to communicate with compatible satellites of a satellite communication network. In some exemplary embodiments, radio network interface 1740 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1740. According to further exemplary embodiments of the present disclosure, the radio network interface 1740 can comprise a PHY layer based on OFDM, OFDMA, and/or SC-FDMA technologies. In some embodiments, the functionality of such a PHY layer can be provided cooperatively by radio network interface 1740 and processor 1710 (including program code in memory 1720).

Core network interface 1750 can comprise transmitters, receivers, and other circuitry that enables network node 1700 to communicate with other equipment in a core network such as, in some embodiments, circuit-switched (CS) and/or packet-switched Core (PS) networks. In some embodiments, core network interface 1750 can comprise the S1 interface standardized by 3GPP. In some embodiments, core network interface 1750 can comprise the NG interface standardized by 3GPP. In some exemplary embodiments, core network interface 1750 can comprise one or more interfaces to one or more AMFs, SMFs, SGWs, MMES, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1750 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1700 can include hardware and/or software that configures and/or facilitates network node 1700 to communicate with other network nodes in a RAN, such as with other eNBs, gNBs, ng-eNBs, en-gNBs, IAB nodes, etc. Such hardware and/or software can be part of radio network interface 1740 and/or core network interface 1750, or it can be a separate functional unit (not shown). For example, such hardware and/or software can configure and/or facilitate network node 1700 to communicate with other RAN nodes via the X2 or Xn interfaces, as standardized by 3GPP.

OA&M interface 1760 can comprise transmitters, receivers, and other circuitry that enables network node 1700 to communicate with external networks, computers, databases, and the like for purposes of operations, administration, and maintenance of network node 1700 or other network equipment operably connected thereto. Lower layers of OA&M interface 1760 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1740, core network interface 1750, and OA&M interface 1760 may be multiplexed together on a single physical interface, such as the examples listed above.

Figure 18:
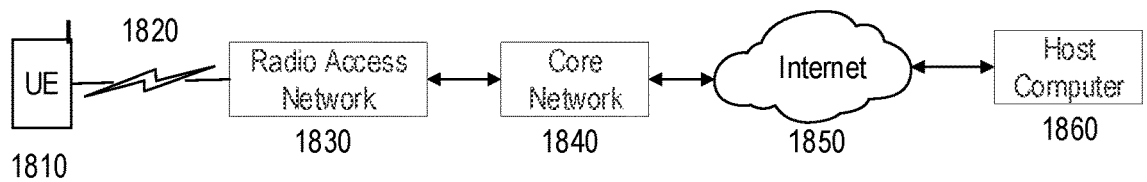
FIG. 18 is a block diagram of an exemplary network configuration usable to provide over-the-top (OTT) data services between a host computer and a user equipment, according to various exemplary embodiments of the present disclosure.

FIG. 18 is a block diagram of an exemplary communication network configured to provide over-the-top (OTT) data services between a host computer and a user equipment (UE), according to one or more exemplary embodiments of the present disclosure. UE 1810 can communicate with radio access network (RAN) 1830 over radio interface 1820, which can be based on protocols described above including, e.g., LTE, LTE-A, and 5G/NR. For example, UE 1810 can be configured and/or arranged as shown in other figures discussed above.

RAN 1830 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1830 can cooperatively operate using licensed and unlicensed spectrum. In some embodiments, RAN 1830 can include, or be capable of communication with, one or more satellites comprising a satellite access network.

RAN 1830 can further communicate with core network 1840 according to various protocols and interfaces described above. For example, one or more apparatus (e.g., base stations, eNBs, gNBs, etc.) comprising RAN 1830 can communicate to core network 1840 via core network interface 1850 described above. In some exemplary embodiments, RAN 1830 and core network 1840 can be configured and/or arranged as shown in other figures discussed above. For example, eNBs comprising an E-UTRAN 1830 can communicate with an EPC core network 1840 via an S1 interface. As another example, gNBs and ng-eNBs comprising an NG-RAN 1830 can communicate with a 5GC core network 1830 via an NG interface.

Core network 1840 can further communicate with an external packet data network, illustrated in FIG. 18 as Internet 1850, according to various protocols and interfaces known to persons of ordinary skill in the art. Many other devices and/or networks can also connect to and communicate via Internet 1850, such as exemplary host computer 1860. In some exemplary embodiments, host computer 1860 can communicate with UE 1810 using Internet 1850, core network 1840, and RAN 1830 as intermediaries. Host computer 1860 can be a server (e.g., an application server) under ownership and/or control of a service provider. Host computer 1860 can be operated by the OTT service provider or by another entity on the service provider's behalf.

For example, host computer 1860 can provide an over-the-top (OTT) packet data service to UE 1810 using facilities of core network 1840 and RAN 1830, which can be unaware of the routing of an outgoing/incoming communication to/from host computer 1860. Similarly, host computer 1860 can be unaware of routing of a transmission from the host computer to the UE, e.g., the routing of the transmission through RAN 1830. Various OTT services can be provided using the exemplary configuration shown in FIG. 18 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 18 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

Embodiments described herein facilitate a UE to obtain a persistence indicator associated with positioning assistance data. Based on the persistence indicator, a UE can determine changes in the assistance data and request updated assistance data only when a change is determined. Advantages include more efficient distribution of assistance data by the network (e.g., using fewer network resources), as well as reducing the risk that a UE performs incorrect positioning measurements and/or position estimates based on invalid assistance data. Such advantages can be very important in certain applications, such as high-precision/high-accuracy positioning and/or low-complexity positioning. When used in NR UEs (e.g., UE 1610) and gNBs (e.g., gNBs comprising RAN 1630), embodiments described herein can provide various improvements, benefits, and/or advantages that facilitate the use of location-based OTT services. As a consequence, this improves the performance of these services as experienced by OTT service providers and end-users, including more precise delivery of services with lower latency without excessive UE energy consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, displaying functions, etc., such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the present disclosure include, but are not limited to, the following enumerated examples.

E1. A method for a user equipment (UE) to obtain positioning assistance data from a wireless network, the method comprising:
  sending a request, to a network node of the wireless network, for a first part of assistance data associated with a cell in the wireless network;
  receiving the first part from the network node in response to the request;
  receiving, via system information (SI) broadcast in the cell, a second part of the assistance data associated with the cell;
  based on the second part, determining a persistence indicator associated with the first part; and
  based on the persistence indicator, selectively requesting, from the network node, an updated first part associated with the cell.

E2. The method of embodiment E1, wherein selectively requesting based on the persistence indicator comprises:
  requesting an updated first part if the persistence indicator indicates that the first part is not persistent; and
  refraining from requesting an updated first part if the persistence indicator indicates that the first part is persistent.

E3. The method of any of embodiments E1-E2, wherein the first part is received from the network node according to one of the following: unicast via a radio network node (RNN), or via on-demand SI broadcast in the cell.

E4. The method of any of embodiments E1-E3, wherein the second part includes an explicit persistence indicator for the first part.

E5. The method of any of embodiments E1-E3, wherein:
  the method further comprises receiving a further second part via SI broadcast in the cell;
  the further second part is received before the second part and substantially contemporaneous with the first part.

E6. The method of embodiment E5, wherein:
  the second part includes an associated version number;
  the further second part includes an associated further version number; and
  determining a persistence indicator comprises:
    determining that the first part is persistent if the version number is equal to the further version number; and
    determining that the first part is not persistent if the version number is not equal to the further version number.

E7. The method of embodiment E5, wherein:
  the second part includes a first number of identifiers of transmission sources of positioning signals;
  the further part includes a second number of further identifiers of transmission sources of positioning signals; and
  determining a persistence indicator comprises:
    determining that the first part is persistent if the first number is equal to the second number and the further identifiers are the same as the identifiers;
    otherwise, determining that the first part is not persistent.

E8. The method of any of embodiments E1-E3, wherein:
  the second part includes an associated expiration time;
  the second part is received before the first part; and
  determining a persistence indicator comprises:
    determining that the first part is persistent if the current time is before the expiration time associated with the second part; and
    determining that the first part is not persistent if the current time is after the expiration time associated with the second part.

E9. The method of any of embodiments E1-E3, wherein:
  the second part includes a timestamp indicating when the second part was received, from the network node, by a radio network node (RNN) that broadcasts the SI;
  the first part is received before the second part; and
  determining a persistence indicator comprises:
    determining that the first part is persistent if the first part was received before the timestamp; and
    determining that the first part is not persistent if the first part was received after the timestamp.

E10. The method of any of embodiments E1-E9, wherein:
  the first part includes an associated area of validity; and
  determining the persistence indicator is further based on whether the cell is within the area of validity.

E11. The method of any of embodiments E1-E10, wherein the first part and the second part are assistance data for the same positioning method.

E12. The method of embodiment E11, wherein:
  the positioning method is UE-based observed time difference of arrival (OTDOA);
  the second part includes relative time difference (RTD) between transmission times of downlink positioning reference signals (DL PRS) from a plurality of sources in the wireless network; and
  the first part includes locations of the plurality of sources.

E13. A method for providing positioning assistance data to one or more UEs in a wireless network, the method comprising:
  receiving, from a UE operating in a cell of the wireless network, a request for a first part of assistance data associated with the cell;

sending the first part to the UE in response to the request;
providing a second part of the assistance data, associated with the cell, to be broadcast in the cell as system information (SI),
wherein the second part includes information that facilitates UE determination of a persistence indicator associated with the first part.

E14. The method of embodiment E13, wherein the first part is sent according to one of the following: unicast via a radio network node (RNN), or via on-demand SI broadcast in the cell.

E15. The method of any of embodiments E13-E14, wherein the second part includes an explicit persistence indicator for the first part.

E16. The method of any of embodiments E13-E14, wherein:
the method further comprises, before providing the second part, providing a further second part of the assistance data, associated with the cell, to be broadcast in the cell as SI; and
the request for the first part is received after providing the further second part but before providing the second part.

E17. The method of embodiment E16, wherein:
the second part includes an associated version number; and
the further second part includes an associated further version number.

E18. The method of embodiment E16, wherein:
the second part includes a first number of identifiers of transmission sources of positioning signals; and
the further part includes a second number of further identifiers of transmission sources of positioning signals.

E19. The method of any of embodiments E13-E14, wherein:
the second part includes an expiration time for the second part; and
the second part is provided before receiving the request for the first part.

E20. The method of any of embodiments E13-E19, wherein the first part includes an associated area of validity.

E21. The method of any of embodiments E13-E20, wherein the first part and the second part are assistance data for the same positioning method.

E22. The method of embodiment E21, wherein:
the positioning method is UE-based observed time difference of arrival (OTDOA);
the first part includes relative time difference (RTD) between transmission times of downlink positioning reference signals (DL PRS) from a plurality of sources in the wireless network; and
the second part includes locations of the plurality of sources.

E23. The method of any of embodiments E13-E22, further comprising receiving, from the UE, a request for an updated first part associated with the cell, in response to the UE determining that the persistence indicator indicates that the first part is not persistent.

E24. A user equipment (UE) configured to obtain positioning assistance data from a wireless network, the UE comprising:
a radio transceiver configured to transmit to and receive from the wireless network; and
processing circuitry operably coupled to the radio transceiver, whereby the radio transceiver and processing circuitry are configured to perform operations corresponding to the methods of any of embodiments E1-E12.

E25. A user equipment (UE) configured to obtain positioning assistance data from a wireless network, the UE being arranged to perform operations corresponding to the methods of any of embodiments E1-E12.

E26. A non-transitory, computer-readable medium storing computer-executable instructions that, when executed by processing circuitry of a user equipment (UE) configured to obtain positioning assistance data from a wireless network, configure the UE to perform operations corresponding to the methods of any of embodiments E1-E12.

E27. A computer program product comprising computer-executable instructions that, when executed by processing circuitry of a user equipment (UE) configured to obtain positioning assistance data from a wireless network, configure the UE to perform operations corresponding to the methods of any of embodiments E1-E12.

E28. A network node configured to provide positioning assistance data to one or more user equipment (UEs) in a wireless network, the network node comprising:
network interface circuitry configured to communicate with the UEs via a radio network node (RNN) serving at least one cell; and
processing circuitry operably coupled to the network interface circuitry, whereby the network interface circuitry and the processing circuitry are configured to perform operations corresponding to any of the methods of embodiments E13-E23.

E29. A network node configured to provide positioning assistance data to one or more user equipment (UEs) in a wireless network, the network node being arranged to perform operations corresponding to any of the methods of embodiments E13-E23.

E30. A non-transitory, computer-readable medium storing computer-executable instructions that, when executed by processing circuitry of a network node configured to provide positioning assistance data to one or more user equipment (UEs) in a wireless network, configure the network node to perform operations corresponding to any of the methods of embodiments E13-E23.

E31. A computer program product comprising computer-executable instructions that, when executed by processing circuitry of a network node configured to provide positioning assistance data to one or more user equipment (UEs) in a wireless network, configure the network node to perform operations corresponding to any of the methods of embodiments E13-E23.

The invention claimed is:
1. A method for a user equipment (UE) to obtain positioning assistance data associated with a cell of a wireless network, the method comprising:
receiving a first part of the positioning assistance data associated with the cell from a positioning node via unicast in the cell;
receiving a second part of the positioning assistance data associated with the cell via system information (SI) broadcast in the cell;
based on the second part, determining a persistence indicator associated with the first part; and
based on the persistence indicator, selectively requesting an updated first part associated with the cell from a network node of the wireless network.

2. The method of claim 1, wherein selectively requesting based on the persistence indicator comprises:
requesting the updated first part from the network node when the persistence indicator indicates that the first part is not persistent; and refraining from requesting the updated first part from the network node when the persistence indicator indicates that the first part is persistent.

3. The method of claim 2, wherein one of the following applies:
the network node is a radio network node (RNN) serving the cell and the updated first part is requested for delivery via on-demand SI broadcast in the cell; or
the network node is the positioning node.

4. The method of claim 1, wherein the second part includes an explicit persistence indicator for the first part.

5. The method of claim 1, further comprising, before receiving the second part, receiving via SI broadcast in the cell a further second part of the positioning assistance data associated with the cell.

6. The method of claim 5, wherein:
the second part includes an associated version number;
the further second part includes an associated further version number; and
determining the persistence indicator comprises:
determining that the first part is persistent when the version number is equal to the further version number; and
determining that the first part is not persistent when the version number is not equal to the further version number.

7. The method of claim 5, wherein:
the second part includes a first number of identifiers of transmission sources of positioning signals;
the further second part includes a second number of further identifiers of transmission sources of positioning signals; and
determining the persistence indicator comprises:
determining that the first part is persistent when the first number is equal to the second number and the further identifiers are the same as the identifiers;
otherwise, determining that the first part is not persistent.

8. The method of claim 1, wherein:
the second part includes an associated expiration time;
the second part is received before the first part; and
determining the persistence indicator comprises:
determining that the first part is persistent when the current time is before the expiration time associated with the second part; and
determining that the first part is not persistent when the current time is after the expiration time associated with the second part.

9. The method of claim 1, wherein:
the second part includes a timestamp indicating when the second part was received, from the network node, by a radio network node (RNN) that broadcasts the SI in the cell;
the first part is received before the second part; and
determining the persistence indicator comprises:
determining that the first part is persistent when the first part was received before the timestamp; and
determining that the first part is not persistent when the first part was received after the timestamp.

10. The method of claim 1, wherein:
the first part includes an associated area of validity; and
determining the persistence indicator is further based on whether the cell is within the area of validity.

11. The method of claim 1, wherein:
the first part and the second part are positioning assistance data for UE-based observed time difference of arrival (OTDOA) positioning method;
the second part includes relative time difference, RTD, between transmission times of downlink positioning reference signals (DL PRS) from a plurality of sources in the wireless network; and
the first part includes locations of the plurality of sources.

12. A method for a positioning node to provide positioning assistance data to user equipment (UEs) operating in a cell of the wireless network, the method comprising:
sending, to one or more UEs via unicast in the cell, a first part of positioning assistance data associated with the cell; and
providing a second part of the positioning assistance data associated with the cell to be broadcast in the cell as system information (SI)
wherein the second part includes information that facilitates UE determination of a persistence indicator associated with the first part.

13. The method of claim 12, wherein one or more of the following applies:
the first part includes an associated area of validity; and
the second part includes an explicit persistence indicator for the first part.

14. The method of claim 12, further comprising, before providing the second part, providing a further second part of the positioning assistance data associated with the cell to be broadcast in the cell via SI.

15. The method of claim 14, wherein one or more of the following applies:
the second part includes an associated version number, and the further second part includes an associated further version number; and
the second part includes a first number of identifiers of transmission sources of positioning signals, and the further second part includes a second number of further identifiers of transmission sources of positioning signals.

16. The method of claim 12, wherein:
the second part includes an expiration time for the second part; and
the second part is provided for broadcast before sending the first part.

17. The method of claim 12, wherein:
the first part and the second part are positioning assistance data for UE-based observed time difference of arrival (OTDOA) positioning method;
the second part includes relative time difference, RTD, between transmission times of downlink positioning reference signals (DL PRS) from a plurality of sources in the wireless network; and
the first part includes locations of the plurality of sources.

18. The method of claim 12, further comprising, when the second part indicates that the first part is not persistent, receiving from a UE a request for an updated first part of the positioning assistance data associated with the cell.

19. A user equipment (UE) configured to obtain positioning assistance data associated with a cell of a wireless network, the UE comprising:
a radio transceiver circuitry configured to communicate with a radio network node (RNN) serving the cell; and
processing circuitry operably coupled to the radio transceiver circuitry, whereby the processing circuitry and the radio transceiver circuitry are configured to:
receive a first part of the positioning assistance data associated with the cell from a positioning node via unicast in the cell;

receive a second part of the positioning assistance data associated with the cell via system information (SI) broadcast in the cell;
based on the second part, determine a persistence indicator associated with the first part; and
based on the persistence indicator, selectively request an updated first part associated with the cell from a network node of the wireless network.

20. A positioning node configured to provide positioning assistance data to user equipment (UEs) operating in a cell of a wireless network, the positioning node comprising:
communication interface circuitry configured to communicate with the UEs via a radio network node (RNN) serving the cell; and
processing circuitry operably coupled to the communication interface circuitry, whereby the processing circuitry and the network interface circuitry are configured to perform operations corresponding to the method of claim 12.

* * * * *